United States Patent [19]

Umezawa et al.

[11] 4,224,647

[45] Sep. 23, 1980

[54] MAGNETIC TAPE-RECORD/PLAYBACK APPARATUS

[75] Inventors: Hiroyuki Umezawa; Masao Ito; Hitoshi Okada, all of Toda, Japan

[73] Assignee: Clarion Co., Ltd., Tokyo, Japan

[21] Appl. No.: 10,613

[22] Filed: Feb. 9, 1979

[30] Foreign Application Priority Data

| Feb. 10, 1978 | [JP] | Japan | 53/13621 |
| Feb. 10, 1978 | [JP] | Japan | 53/16301 |
| Feb. 13, 1978 | [JP] | Japan | 53/15579 |
| Feb. 21, 1978 | [JP] | Japan | 53/18081 |
| Feb. 22, 1978 | [JP] | Japan | 53/20759 |

[51] Int. Cl.$^2$ .................. G11B 15/10; G11B 15/24; G11B 19/26
[52] U.S. Cl. .................. 360/96.3; 360/71; 360/74.1; 360/105
[58] Field of Search .......... 360/96.3, 96.1, 96.2, 360/96.4–96.6, 74.1, 71, 74.2–74.4, 105, 73; 242/197–201

Primary Examiner—Alfred H. Eddleman
Attorney, Agent, or Firm—Wallenstein, Spangenberg, Hattis & Strampel

[57] ABSTRACT

A magnetic tape-record/playback apparatus having a mechanism for fast forward/rewind operation, which is formed of an ejecting lever and plate which are provided separately from each other but slidably connected with each other, a spring provided between said ejecting lever and a frame of the apparatus to urge said lever to its original position, a rotatable disc provided in association with said ejecting lever to effect a switching operation in relation with the fast forward/rewind operation and provided with a pin engageable with a slot formed on said ejecting lever, said slot having an enlarged portion with convergent edges for resetting said rotatable disc to its position for ejection, and an engaging member provided in relation with said rotatable member and adapted to be engaged with a stepped portion of said rotatable member to keep a head assembly of the apparatus in the fast forward/rewind mode.

6 Claims, 27 Drawing Figures

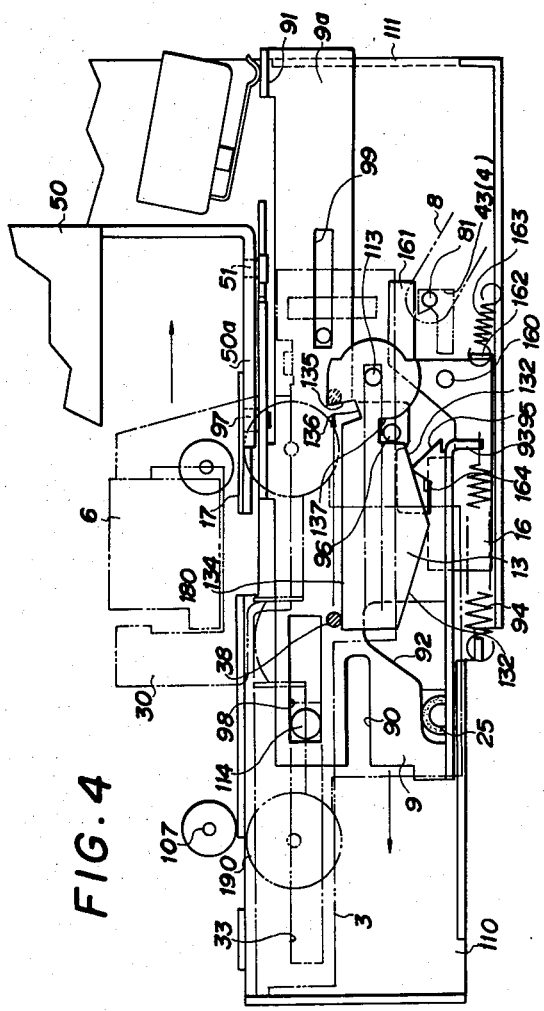

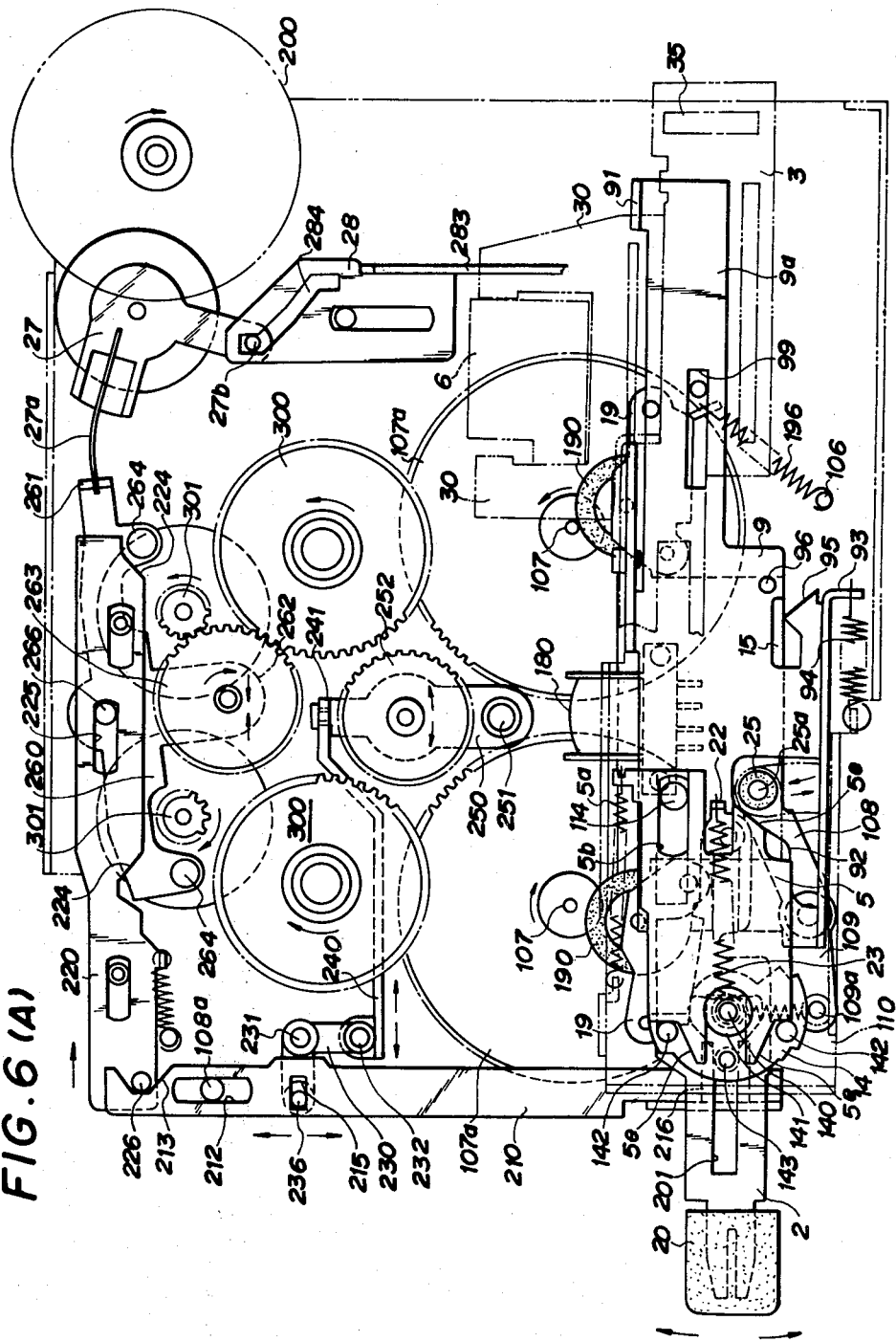

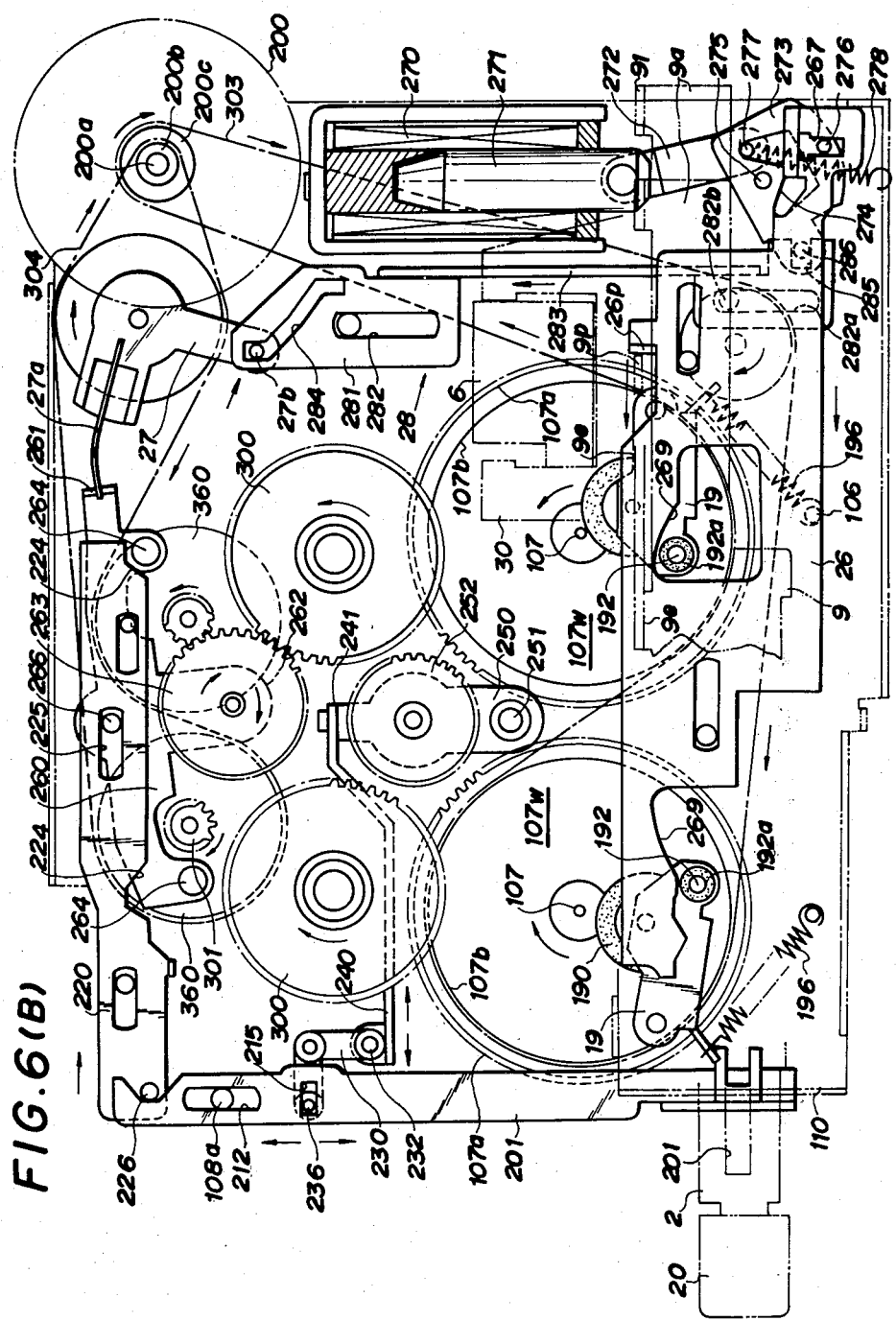

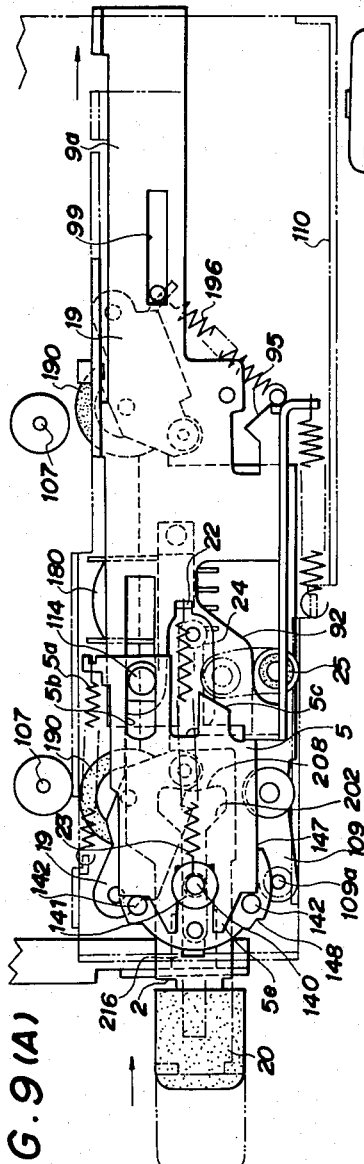
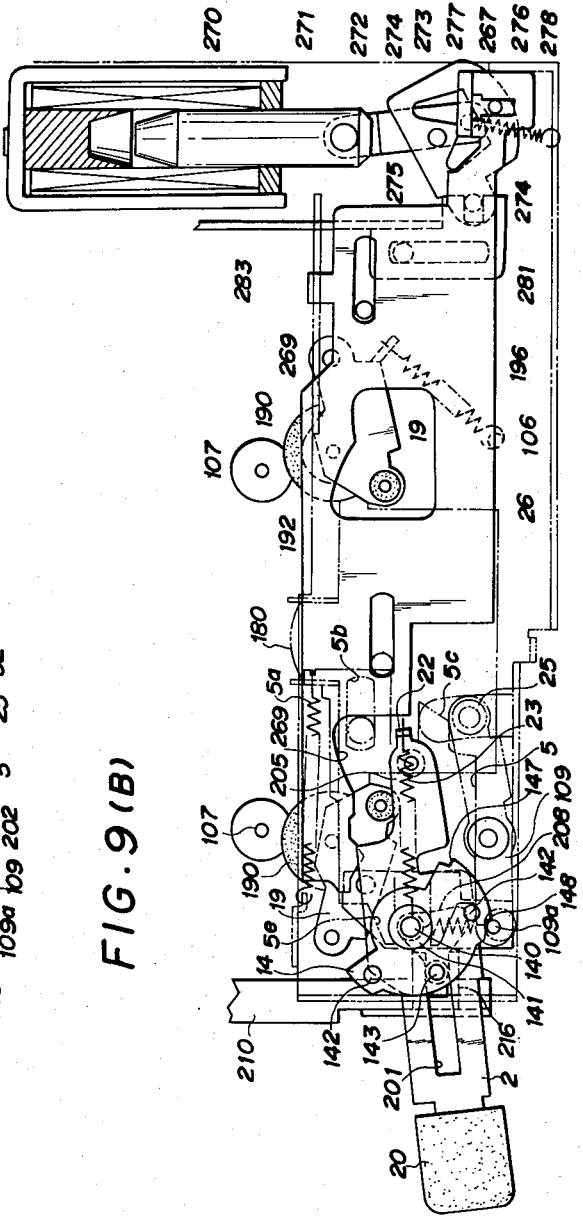
FIG. 9(A)
FIG. 9(B)

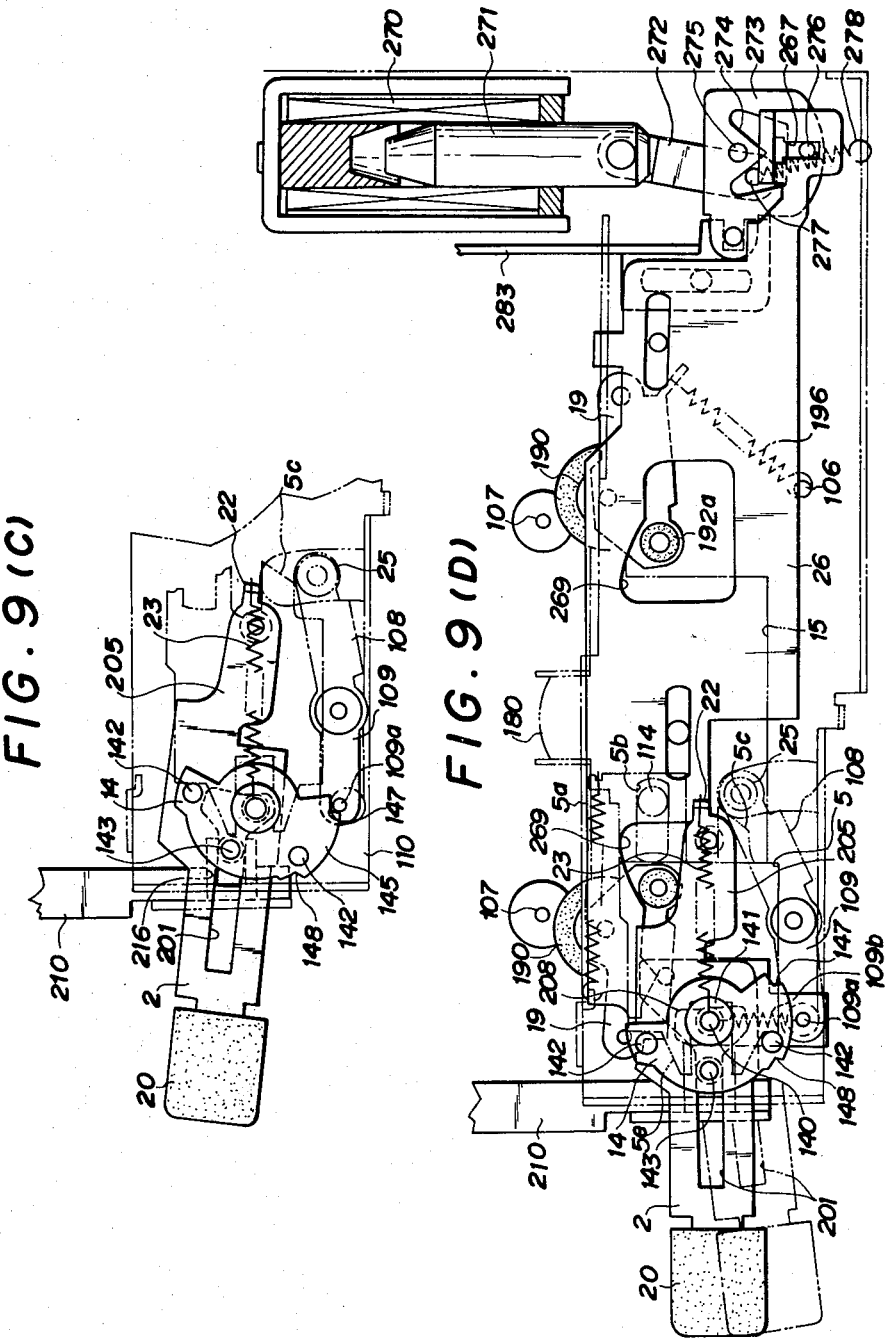

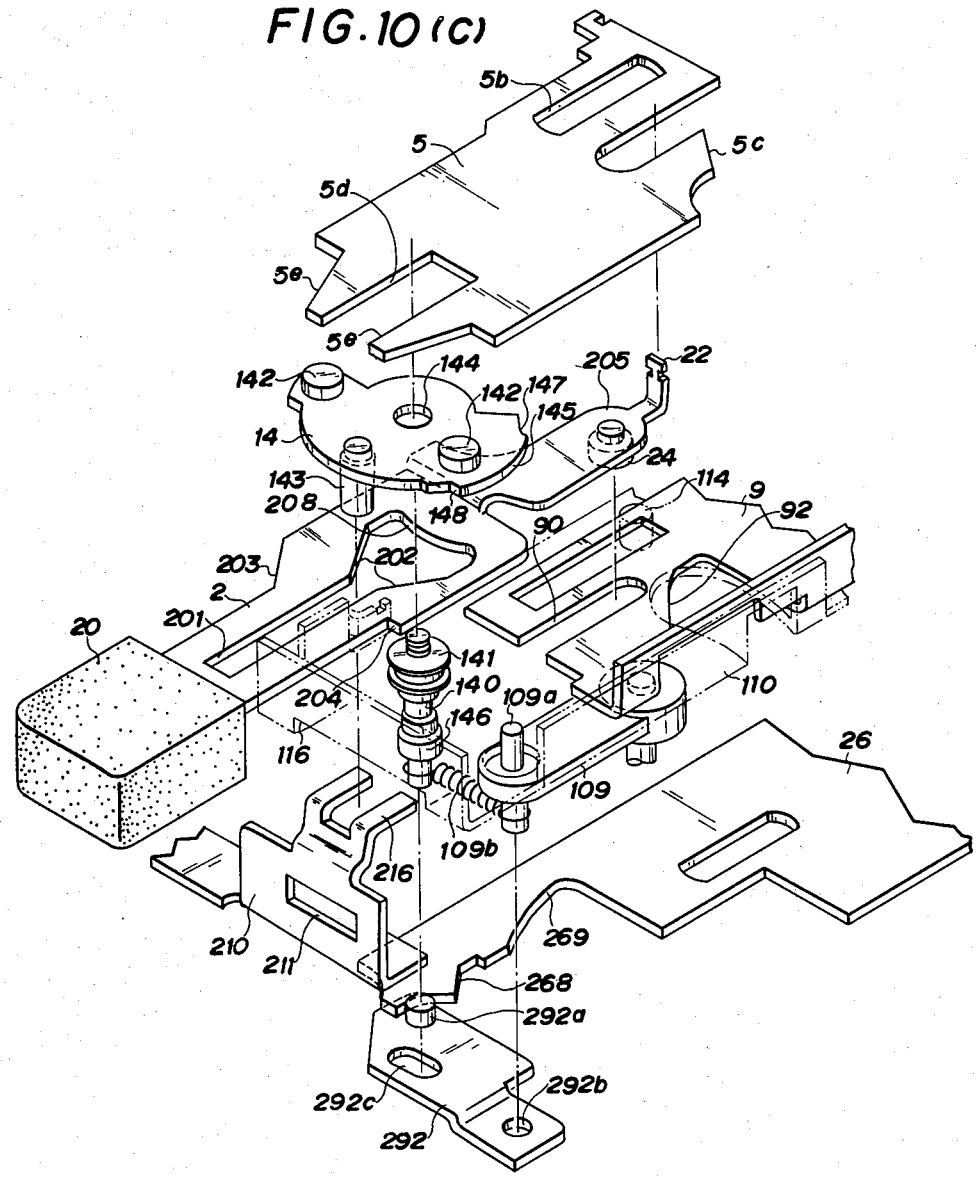

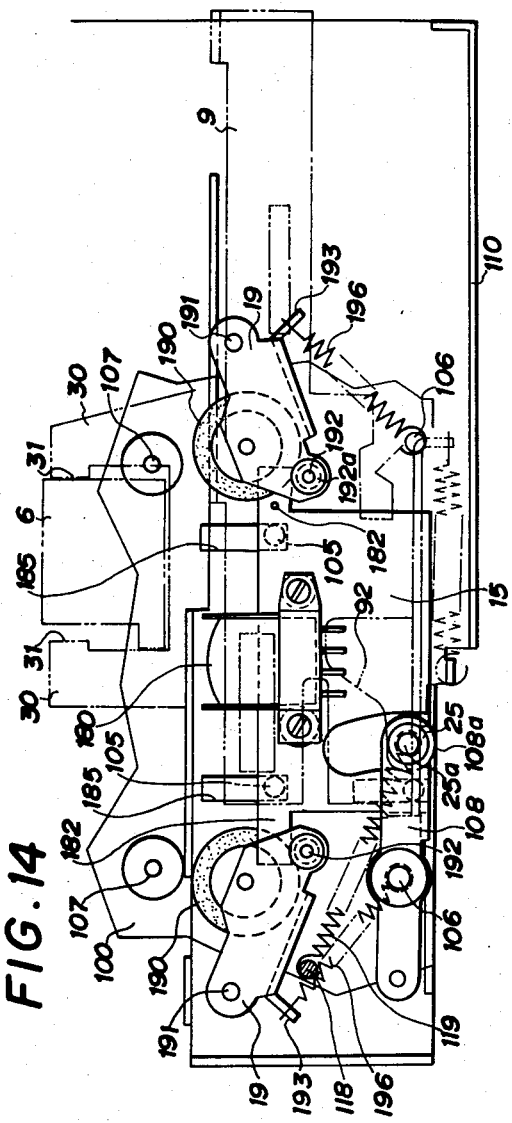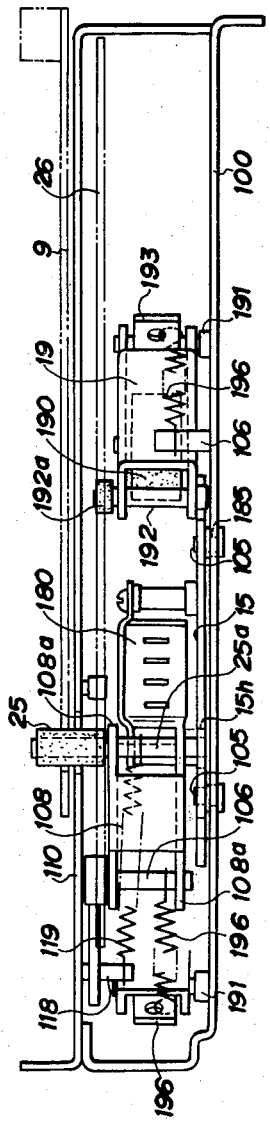
FIG. 14
FIG. 15

MAGNETIC TAPE-RECORD/PLAYBACK APPARATUS

BACKGROUND OF THE INVENTION

This invention relates to a magnetic tape-record/playback apparatus, and more particularly to an apparatus of the type which has an improved mechanism in association with fast forward/rewind operation especially suitable for a tape player adapted to be mounted on a dashboard of an automobile.

It is essential that a tape player has a function of providing a fast forward/rewind mode of tape feed as well as a normal tape feed mode to reproduce portions desired, to repeat reproduction, or to attain various modes of reproducing and recording. In response to these requirements, there have been proposed various fast forward/rewind mechanisms for tape player. Such mechanisms as known generally have an operating portion, such as a pushbutton or a knob, provided separately from operating portions of other mechanisms in the tape player and arranged on the front panel of the tape player together with said other operating portions. In case the so arranged tape player is used for a mobile stereo and especially where the player is assembled with a pushbutton tuner, a considerable number of operating buttons or knobs are disposed along the front panel of the assembly. This will possibly make the user be embarrassed as to which button or knob should be operated. It is therefore desired to reduce the number of the buttons or knobs arranged on the front panel. This is also desirable for other mobile units than mobile stereo which are mounted on the dashboard of an automobile in view of a fact that the mobile units with a reduced number of operating portions are advantageous to be mounted in a restricted space such as a driver's room etc.

OBJECTS AND SUMMARY OF THE INVENTION

It is therefore an object of the present invention to provide a magnetic tape-record/playback apparatus having a mechanism for fast forward/rewind operation which is adapted to be actuated upon operation of an ejecting lever.

It is another object of the present invention to provide a magnetic tape-record/playback apparatus which is capable of forming the fast forward/rewind mode by operating the ejecting lever and keeping the mechanism from damage possibly caused by misoperation of the lever.

It is a further object of the present invention to provide a magnetic tape-record/playback apparatus which is capable of keeping the ejecting lever in its reset normal position every after operation of the same.

It is a still further object of the present invention to provide a magnetic tape-record/playback apparatus which is capable of locking and releasing the fast forward/rewind mode positively and yet easily.

It is a still further object of the present invention to provide a magnetic tape-record/playback apparatus which is capable of starting the tape in a predetermined direction.

It is a still further object of the present invention to provide a magnetic tape-record/playback apparatus which is capable of operating a head plate mounting a head assembly thereon precisely and smoothly with a simplified structure.

It is a still further object of the present invention to provide a magnetic tape-record/playback apparatus which employs improved involute gears and enables smooth transmission of the rotation force.

Essentially according to the present invention, there is provided a magnetic tape-record/playback apparatus having a mechanism for fast forward/rewind operation which comprises: an ejecting lever for removing a magnetic tape; an ejecting plate provided separately from said ejecting lever; interlocking means for interlocking said ejecting lever and said ejecting plate allowing relative sliding movement therebetween; a spring provided between said ejecting lever and a frame of said apparatus to urge said ejecting lever for resetting said lever to its original position; a rotatable member actuatable to effect a switching operation in association with fast forward/rewind mode and having a pin and a stepped portion formed thereon; an opening formed on said ejecting lever and having a slot portion engageable with said pin and a portion defined by convergent edges operative to reset said rotatable member to its position for tape ejecting operation; and an engaging member provided in relation with said stepped portion of the rotatable member for keeping a head assembly of the apparatus in the fast forward/rewind mode.

BRIEF DESCRIPTION OF THE DRAWINGS

FIG. 4 is a plan view of a mechanism for ejecting operation, showing its state before the cassette is loaded.

FIG. 5 is a plan view of a mechanism for ejecting operation, showing its state where the cassette has been loaded in a record/playback position.

FIGS. 6(A) to (C) are plan views each showing a positional and operational relationship between an ejecting lever and a fast forward/rewind operation mechanism in accordance with the present invention.

FIGS. 9(A) to (D) are fragmentary plan views showing the ejecting operation.

FIG. 14 is a fragmentary plan view showing a head plate actuating mechanism.

FIG. 15 is a side elevational view of the mechanism shown in FIG. 14.

PREFERRED EMBODIMENTS OF THE INVENTION

Figure 1:
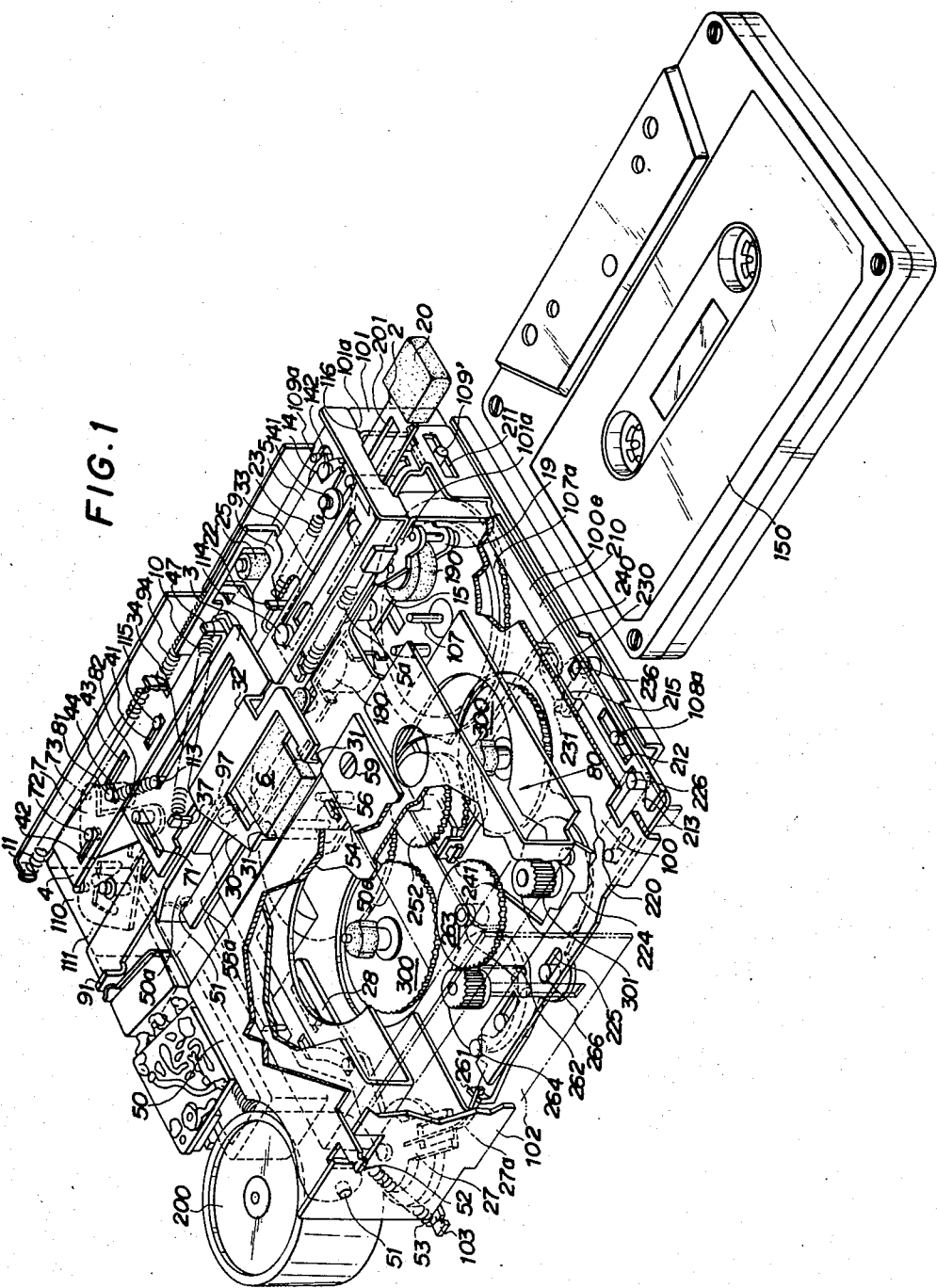
FIG. 1 is a perspective view of a magnetic tape-record/playback apparatus in accordance with the present invention and a cassette to be loaded into the apparatus.
Figure 2:
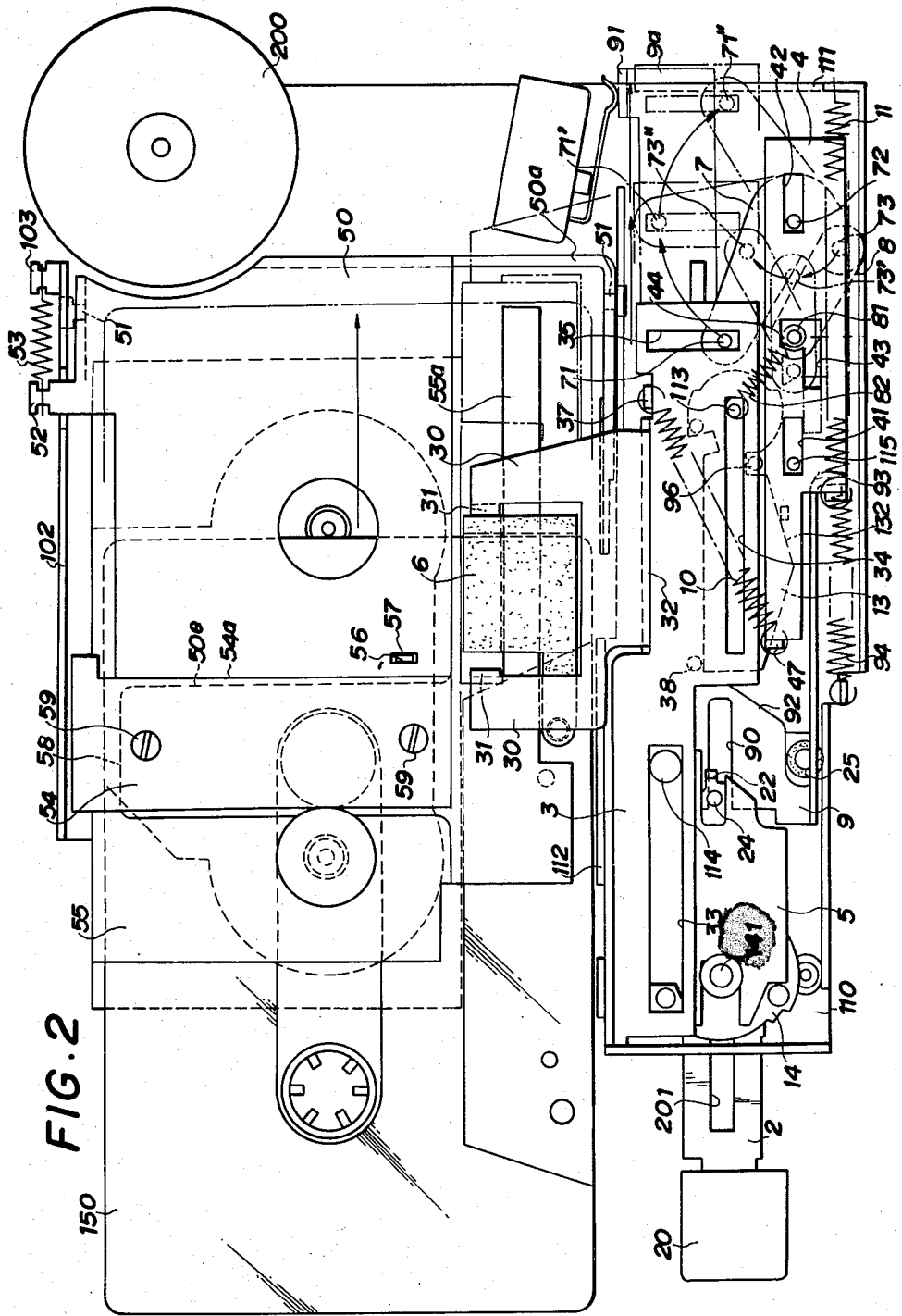
FIG. 2 is a plan view of the magnetic tape-record/playback apparatus shown in FIG. 1.
Figure 3:
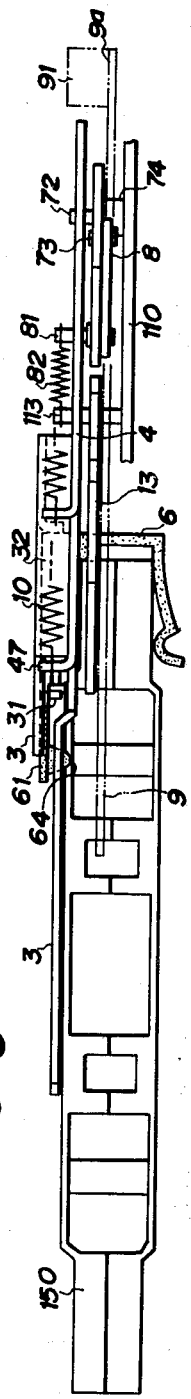
FIG. 3 is a side view of the magnetic tape-record/playback apparatus shown in FIG. 1.

Referring now to the drawings, there is illustrated one preferred form of magnetic tape-record/playback apparatus, in accordance with the present invention. A main chassis 100 has an upright portion 101 formed at its front portion. An auxiliary deck 110 is formed of an elongated plate extending in the direction of the depth of the apparatus and secured to said upright portion with a part thereof superposed on a bent portion 101a of the upright portion 101. The auxiliary deck 110 has at is inner end a vertical portion 111 extending downwardly therefrom. Through this portion 111, the auxiliary deck 110 is secured to the inner end portion of the main chassis at a given hight as shown in FIG. 2. A cassette loading space 80 as shown in FIG. 1 is provided on the main chassis 100 between an erected portion 112 formed along one side of the auxiliary deck 110 as shown in FIG. 2 and a side wall 102 fixed to a side of the main chassis. At the interior of the cassette loading space 80, a swingable frame 50 is pivotably supported at its base end. The swingable frame 50 has a base portion 50a extending and bent in an L-shape along its one side. A tension spring 53 is provided between a spring rest 52 projected intermediate the swingable frame 50 and another spring rest 103 provided at a lower portion of the side wall 102 so that a tip end portion of the swingable frame 50 is urged downwardly. A cassette holder 55 is flexibly coupled with the swingable frame 50 at its tip end portion. Stated illustratively, the cassette holder 55 extends outwardly of the tip end 50e of the swingable frame 50 and inwardly to the vicinity of the pivotal point 51 of the swingable frame 50. The holder 55 is provided with a convexed portion 58 intermediate thereof which has a height slightly exceeding the height of the tip end portion of the swingable frame 50. A fixing plate 54 is secured over the convexed portion 58 by screws 59, 59 allowing the plate 54 to a bit hand over the tip end 50e of the swingable frame 50. An elongated slot 57 is formed at the tip end portion of the swingable frame 50 and engaged with a projection 56 formed on the cassette holder 55 at a position inner than the convexed portion 58. Thus, the locking between the cassette holder 55 and the tip end 50e of the swingable frame 50 is assured by the engagement between the projection 56 and the slot 57. On the other hand, a gap formed by a lower face of the fixing plate 54 and an upper face of the cassette holder 55 and determined by a height of the convexed portion 58 allows the flexible coupling between the tip end 50e of the swingable frame 50 and the cassette holder 55.

A cassette loading mechanism and an ejecting mechanism in accordance with the present invention are generally mounted on the auxiliary deck 110 located on a side of the cassette loading space 80. The cassette loading mechanism includes a main slide plate 3 having engaging portions 31, 31 which extend to hang over the cassette loading space 80 and are adapted to abut against a holding member 6 adapted to slide along a guide 55a provided on a side of the cassette holder 55, holding a forward end of the cassette being loaded; an auxiliary slide plate 4 which is provided at position adjacent to said main slide plate 3 substantially at the same height as of said plate 3, and an L-shaped drawing interlocking member 7 provided across the lower surface of the slide plates 3 and 4. On the other hand, the ejecting mechanism comprises an ejecting lever 2, a main ejecting plate 9 slidable in association with actuation i.e. depression of the ejecting lever 2, an ejecting interlocking member 13 disposed on said main ejecting plate 9 and pivotably supported at its rear end by a pivotal shaft 113 provided on the auxiliary deck 110, an actuating member 16 pivotably connected intermediate thereof to said auxiliary deck 110, and a slide member 5 provided under the main slide plate 3 at the base portion of the auxiliary deck 110. Though the cassette loading mechanism and the ejecting mechanism are generally classified as mentioned above, they are interconnected with each other and accordingly operatively associated with each other as will be mentioned in detail later.

The particulars of the components constituting the cassette loading mechanism are now explained. The engaging portions 31, 31 of the main slide plate 3 are formed on arms of the main slide plate 3 by bending the tip end thereof downwardly. The arms 30 extends in a plane slightly raised that that of the main slide plate 3 by forming a stepped portion 32. The main slide plate 3 has two guide slots 33 and 34 which extend at its forward and rear portions, respectively, in a longitudinal direction thereof. Another guide slot 35 extending at the rear portion of the main slide plate 3 in the width direction thereof. A pin 114 provided on the auxiliary deck 110 is engaged with the first guide slot 33, the pivotal shaft 113 for pivotably supporting the ejecting interlocking member 13 with the second guide slot and a pin 71 provided at a tip end of the drawing interlocking plate 7 with the third guide slot 35. The thus formed main slide plate 3 and the auxiliary slide plate 4 are connected with each other by a tension spring 10 provided between a spring rest 37 of the main slide 3 and a spring rest 47 at the base end of the auxiliary slide plate 4. The auxiliary slide plate 4 has two slots 41 and 42 provided at a position intermediate thereof and at a rear position thereof, respectively, and extending in the longitudinal direction thereof. An L-shaped slot 43 is further formed on the auxiliary slide plate 4 between the slots 41 and 42. An engaging projection 44 is provided at the inside of the bent portion of the L-shaped slot 43. A pin 115 on the auxiliary deck 110 is engaged with the first slot 41, and a shaft 72 on the auxiliary deck 110 passed through the L-shaped drawing interlocking member 7 at its corner portion with the second slot 42. The shaft 72 has a coller portion 74 in relation with the auxiliary deck 110. With the L-shaped slot 43 is engaged a pin 81 provided at a tip end portion of the interlocking link 8. The pivotal shaft 113 and the pin 81 are connected with each other by a tension spring 82 provided therebetween, and the base end of the interlocking member 8 is rotatably connected to another tip end of the drawing interlocking member 7 by a connecting pivot 73.

The components constituting the ejecting mechanism will be described in detail. The ejecting lever 2 has a knob 20 attached to its base end. A guide slot 201 is formed in the ejecting lever 2 in the longitudinal direction thereof and adapted to engage with a pin 140 protruded from the bottom face of a rotatable disc 14. Thus, the ejecting lever 2 is adapted to retreat, upon depression of the knob 20, along its length. Further, between a spring rest 22 provided at the rear end of the ejecting lever 2 and a pivotal shaft 141 of the rotatable disc 14 is provided a spring 23. On the lower face of the ejecting lever 2 at a portion in the vicinity of the rest 22 is provided a pin 24 projected so as to be engaged with a groove 90 formed at the base portion of the main ejecting plate 9. The main ejecting plate 9 has an extended portion 9a to form a switch operating portion 91 as can be seen from FIGS. 4 and 5. The main ejecting plate 9 has a cammed portion 92 for operating a head plate 15 as will be mentioned in detail later in a positional relation with the groove 90 as depicted in FIGS. 4 and 5. A roller 25 engaged with the head plate 15 is adapted to abut against said cammed portion 92 to advance or retreat said head plate 15 to and from the cassette loading space 80. The main ejecting plate 9 has a spring rest 93 formed at its one side portion intermediate thereof, and between the rest 93 and the auxiliary deck 110 is provided a resetting spring 94. The main ejecting plate 9 further has a projected portion 95 formed at a position near the rest 93 and acting on a projection 164 of the actuating member 16 on the auxiliary deck 110 to push a free end of the actuating member 16 inwardly when the main ejecting plate 9 is depressed or pushed inwardly. A projection 96 is provided on the upper face of the plate 9 at a position inner than the projected portion 95 and adapted to follow a cammed portion 132 of the ejecting interlocking member 13. A pin 38 on the bottom face of the main slide plate 3 for the cassette loading operation is adapted to abut against a linear edge 134 of the ejecting interlocking member 13 in the course of pulling or pushing operation of the main slide plate 3 as apparent from FIGS. 2 and 4 but abut against an engaging edge 135 of the ejecting interlocking member 13 as shown in FIG. 5 when the main slide plate 3 is pushed inwardly. Accordingly, when the main slide plate 3 is further pushed inwardly, the ejecting interlocking member 13 is rotated around the pivotal shaft 113 and the pin 38 is received in a notch 136 of the ejecting interlocking member 13, allowing the rotation of the member 13 around 113. The rotation of the member 13 in turn disengages the projection 96 of the main ejecting plate 9 from a recessed portion 137 of said member 13 releasing the locking relation therebetween. Then, the ejecting plate 9 returns to its normal position as shown in FIG. 5 by the action of the spring 94, and the projection 96 acts on the cammed portion 132 to assure desired rotation of the ejecting interlocking member 13 as shown in FIG. 5. The actuating member 16 is mounted on the auxiliary deck 110 by a pivotal pin 160 and formed, at its one end, with an extension 161 adapted to abut against the pin 81 of the interlocking member 8 for the cassette loading mechanism. The actuating member 16 is urged to return to its position as shown in FIG. 4 by a tension spring 163 provided between a rest 162 and the auxiliary deck 110. When the main ejecting plate 9 advances, the actuating member 16 is rotated as shown in FIG. 5 to release the lock of the pin 81 with the projection 44 and to restore the auxiliary slide plate 4 to its normal position by the action of the spring 11 and, since the actuating member 16 has the projection 164 at its end portion as mentioned above, the actuating member 16 returns to its position as shown in FIG. 4 after the projected portion 95 has passed over the projection 164.

Figure 11:
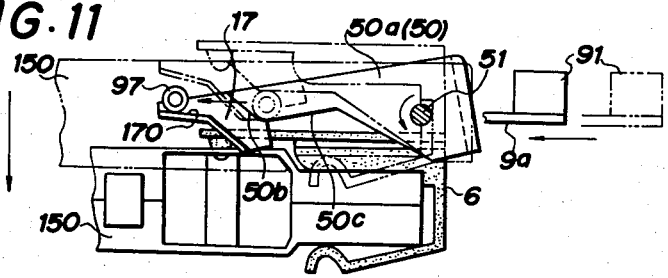
FIG. 11 is an explanatory view showing the operation of a base end portion of a swingable frame.
Figure 12:
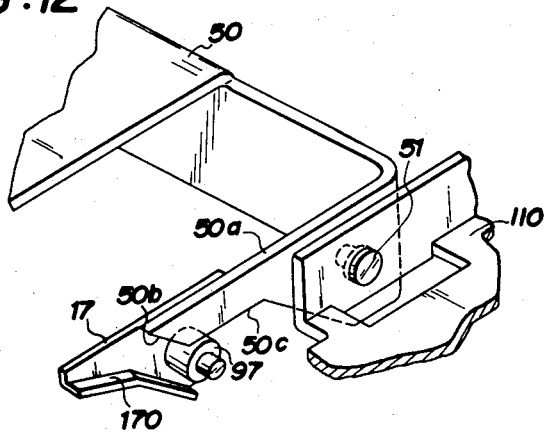
FIG. 12 is a perspective view of the portion shown in FIG. 11.

A structure for putting a cassette 150 drawn into the interior of the cassette loading space 80 into a playback position is shown in FIGS. 11 and 12. Stated illustratively, a guide member 17 having a dog-legged guide portion 170 is fixed to a tip end of the base portion 50a extending in an L-shaped from the swingable frame 50. The base portion 50a has an inclined lower face 50b confronting said rail portion 170. A roller 97 provided at a side portion of the main ejecting plate 9 as shown in FIG. 9 is adapted to contact said guide portion 170. In the course of the forward movement or advance of the main ejecting plate 9 by means of the spring, the roller 97 is brought into contact with the inclined face 50b leaving the bottom face portion of the base portion 50a so that the swingable frame 50 is inclined downwardly by the action of the spring 53. When the roller 97 disengages from the inclined face 50b, the upper face of the guide portion 170 is pressed downwardly and the base portion of the swingable frame 50 is sufficiently depressed downwardly around the pivots 150, 150 to force the cassette holder flexibly coupled with the tip end of the swingable frame 50 into a playback position on the main chassis 100 keeping a horizontal position. This playback position is positively maintained by the spring 53. In the ejecting operation, when the roller 97 passes through the guide portion 170 by the advance of the main ejecting plate 9, the position as shown is attained.

Figure 7A:
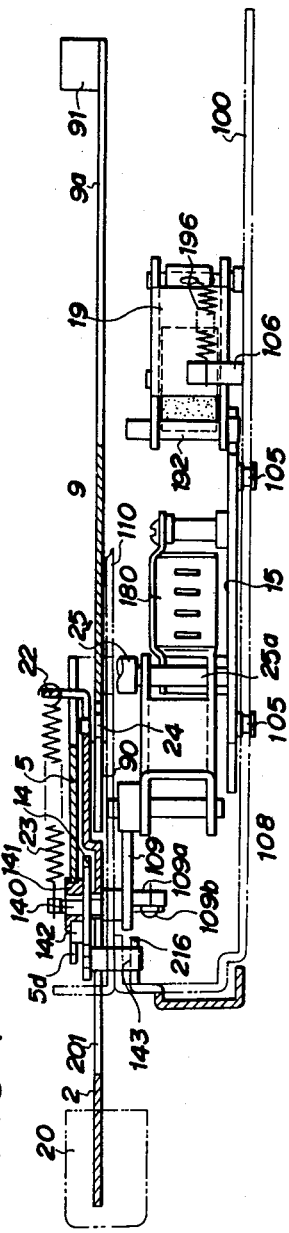
FIGS. 7(A) and (B) are side elevational sectional views of the mechanism shown in FIGS. 6(A) to (C) taken along the ejecting lever.
Figure 10A:
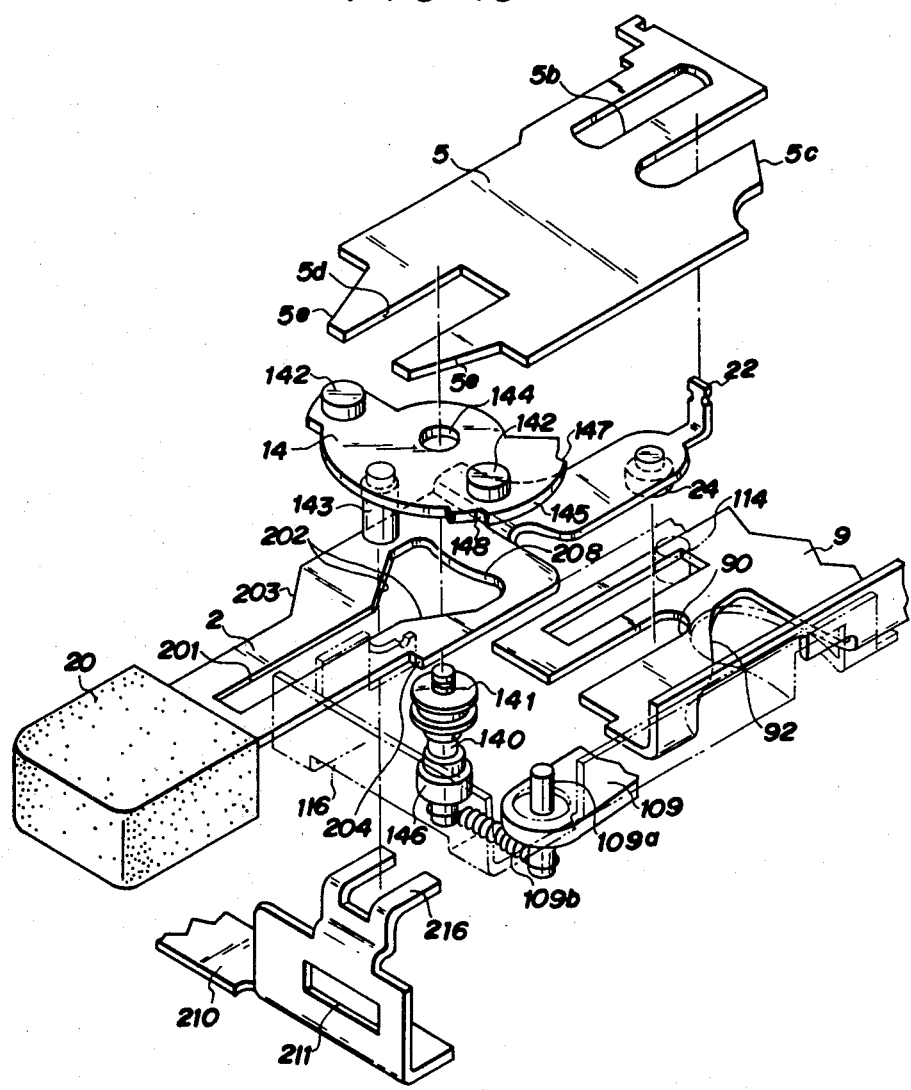
FIGS. 10(A) to (C) are exploded perspective views of principal components of the mechanism shown in FIGS. 6(A) to (C).
Figure 10:
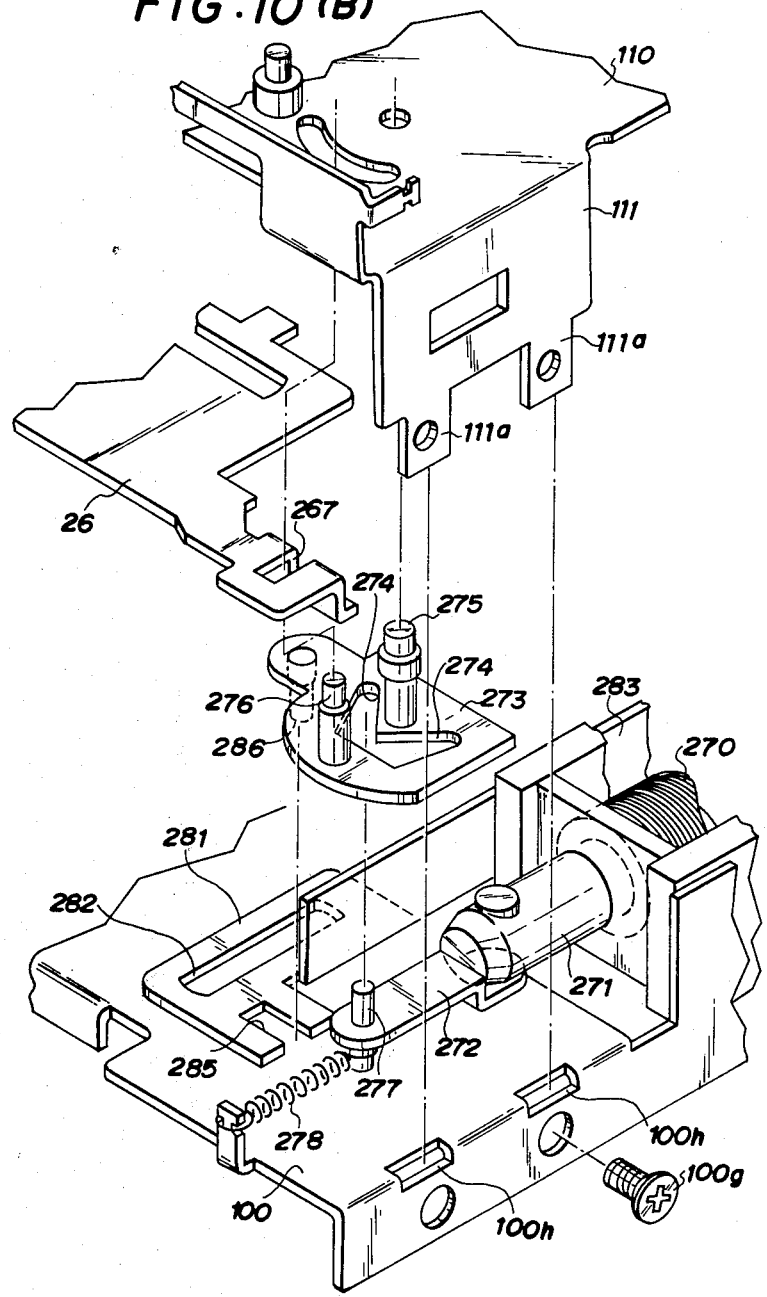

The detailed structure of the ejecting lever 2 is shown in FIGS. 6(A) and 7(A). More particularly, the ejecting lever 2 has the rest 22 for the spring 23 at its forward end as mentioned above and as shown in FIGS. 7(A) and 9(A). The lever 2 has the pin 24 on its lower face at a position in the vicinity of the rest 22 as mentioned above. The pin 24 engages with the groove 90 of the main ejecting plate 9. It will be thus seen that when the ejecting lever 2 is pushed inwardly along the guide slot 201 as shown in FIG. 10(A), the pin 24 forces the main ejecting plate 9 after it engages with the bottom of the groove 90. Then, the mechanism associated with the main ejecting plate 9 effects the ejecting operation as mentioned above. On the other hand, the ejecting lever 2 is laterally actuatable to left and right positions around the pin 24 as shown by arrows in FIG. 6(A). The ejecting lever 2 has the slot 201 formed centrally in the longitudinal direction as most clearly shown in FIG. 10(A). With this slot 201 is engaged a pin 143 provided on the lower face of the rotatable disc 14 at its forward portion. The slot 201 has a portion defined by symmetrically formed convergent edges 202 and enlarged portion 208 at its interior portion. The rotatable disc 14 has a shaft hole 144 through which the disc 14 is mounted on the bottom of the pivotal shaft 141 engaged with a notch 5d formed in the slide member 5 at its forward portion. The shaft 141 is rotatably mounted on a rod 140 provided on the auxiliary deck 110. The rod 140 has a portion extending lower than the auxiliary deck 110 and fitted with a roller 146. The roller 146 is connected to a shaft 109a of an operating member 109 attached to a link member 108 provided to the roller 15 through an interlocking member 292 and through a spring 109b provided therebetween. The shaft 109a extends upper than the operating member 109 and adapted to abut against an arc edge 145 formed on the rotatable disc. The disc 14 has stepped portions 147 and 148 formed at the ends of the arc 145 and pins 142, 142 provided at a position near the stepped portion 148 and a position generally opposite thereto, respectively. The stepped portions 147 and 148 each have a slight angle with the radial direction around the shaft hole 144 so that when a relatively strong force for rotation in the opposite direction is applied to the disc 14 in contact with the stepped portion the lock or engagement therebetween is released due to such a slight angle provided to the stepped portion, restoring the disc 14 to its normal position.

Figure 8A:
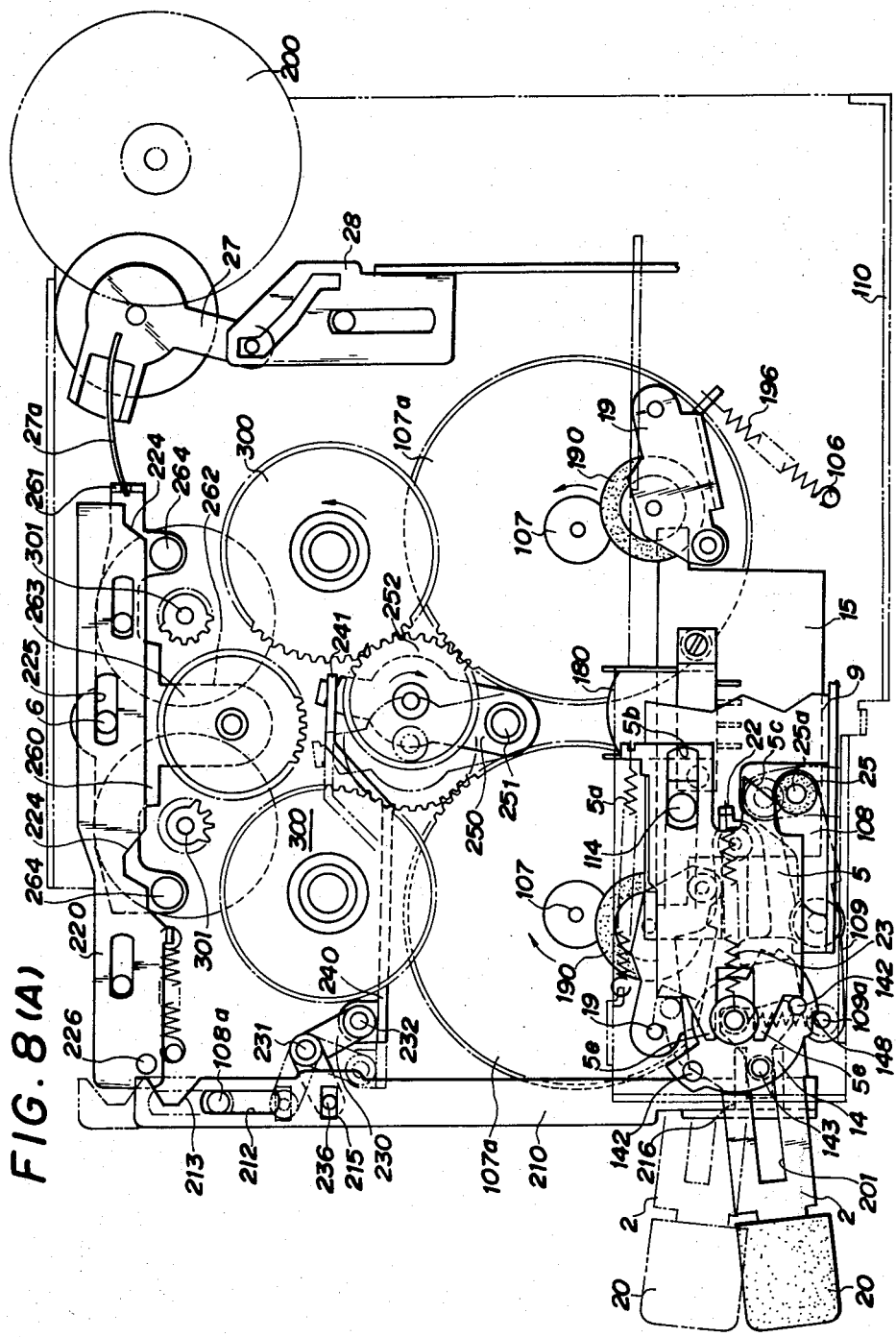
FIGS. 8(A) and (B) are explanatory plan views of the mechanism shown in FIGS. 6(A) to (C), showing a fast forward/rewind mode.

The pin 143 engaged with the slot 201 of the ejecting lever 2 is projected downwardly through an opening 116 formed on the auxiliary deck 110 at its base end portion. The pin 143 is engaged with a fork portion 216 formed at the base portion of a fast forward/rewind actuator lever 210. The actuator lever 210 has an elongated slot 211 engaged with a pin 109' provided at a lower portion of the upright portion 101 of the main chassis 100. The lever assembly thus mounted along the bottom of the main chassis is further adapted to slide laterally with a slot 212 engaged with a pin 108a provided at a side portion of a front edge 100e of the main chassis 100. The actuator lever 210 has a recessed cammed portion 213 at its one side portion as shown in FIGS. 1 and 6(A) and has another slot 215 extending intermediate thereof in its width direction. With the cammed portion 213 is engaged a pin 226 provided on an interlocking member 220 at its forward end which is disposed on the main chassis 100 extending in the longitudinal direction. The slot 215 is engaged with a pin 236 provided at one end portion of an L-shaped interlocking member 230 which is pivotably supported intermediate thereof on the main chassis 100. As shown by arrows in FIG. 6(A) and mentioned above, when the ejecting lever 2 is rotated to the left or right, the actuator lever 210 is caused to slide to the left or to the right. This in turn will displace the interlocking member 220 by the cammed portion 213 inwardly as shown in FIG. 8(A), namely in a direction shown by an arrow in FIG. 6. The L-shaped interlocking member 230 is rotated around 231 and a selector plate 240 pivotably connected to the L-shaped interlocking member 230 at 232 is also displaced inwardly as shown by an arrow of FIG. 6(A). The tip end of the selector plate 240 is connected at 241 to a tip end of a gear plate 250 pivotably supported at its base end by a pin 251 on the main chassis 100. An intermediate gear 252 rotatably provided intermediate the gear plate 250 is brought into mesh with either one of flywheels 107a, 107a coaxial with capstans 107, 107 and either one of reel base gears 300, 300 upon sliding of the selector plate 240. Thus, the rotation of the flywheel gear 107a which is much larger in diameter than the capstan 107 is directly conveyed to the reel base gear 300 through the intermediate gear 252.

The interlocking member 220 assumes a position as shown by a solid line in FIG. 6(A) in a normal condition where the pin 226 is engaged with the recess of the cammed portion 213. An interlocking gear support 260 rockable around a shaft 266 provided on the main chassis 100 and received in an elongated slot 225 formed intermediate the interlocking member 220. The support 260 has a receiving portion 261 to which a resilient member 27a provided at a tip end of an actuator 27 is connected. The actuator 27 is responsive to a changeover operation by a plunger 271 operated by a tape end detection signal through an interlocking gear switcher 28, to rock the support 260 to right or left. An interlocking gear 263 at a support portion 262 projectingly formed intermediate the support 260 is then meshed with or disengaged from either one of the reel base gear 300, 300 and either one of a small gear 301, 301 driven by a motor to determine a rotation mode of the reel base gear for feeding the cassette tape forwardly or reversely. The interlocking member 220 is pushed inwardly in a direction of the arrow shown in FIG. 6 when the pin 226 is depressed by either one of the slanting edges of the cammed portion 213 upon the actuation of the selector lever 210. When either one of slanting cammed portions 224, 224 formed on the interlocking member 220 forces a corresponding one of rollers 264, 264, the support portion 262 in an inclined position as shown in FIG. 6(A) is brought into a right position as shown in FIG. 8(A). By bringing the support portion 262 into a position right with the length of the interlocking member 220, the interlocking gear 263 is disengaged from either of the reel base gears 300, 300 and the small gears 301, 301. The driving relation between either of the small gears 301, 301 and the reel base gears 300, 300 is cancelled. It will be then appreciated that by driving the reel base gear 300 released from the normal driving relation through the flywheel gear 107a, the desired fast forward/rewind mode can be smoothly attained.

In association with the alternating rocking operation of the support plate 260 as mentioned above, the interlocking gear switcher 28 is provided with plane portions 281, 281 at opposite end portions thereof as apparent from FIG. 6(C) and FIGS. 11(B) to (D). One of the plane portions 281 has a guide slot 282 and the switcher 28 is regulated in its sliding direction by a guide pin engaged with said slot 282. Between the plane portions 281 and 281 is formed an upright portion 283. On one of the plane portions 281 is provided a guide slot 284 as depicted in FIG. 6(A). A pin 27b on the actuator 27 is engaged with the guide slot 284. On another plane portion 281 a notch 285 is formed in a direction perpendicular to the sliding direction of the switcher 28. A pin 286 provided on the lower face of the cam plate 273 as depicted in FIG. 10(B) is engaged with said notch 285.

It will be thus seen that when the cam plate 273 is rotated upon the actuation of the electromagnetic plunger 271, the switcher 28 is caused to slide in its longitudinal direction through the pin 286. Accordingly, the pin 27b of the actuator 27 is displaced between positions as shown by a solid line and a phantom line in FIG. 8(B) to rock the support plate 260 through the resilient member 27a.

When the ejecting lever 2 is tilted to form the fast forward/rewind mode, the rotatable disc 14 is caused to rotate and the slide member 5 is forced by either one of the pins 142 against the action of a spring 5a provided between the slide member 5 and the auxiliary deck 110. This forced position is maintained by engagement between the stepped portion 147 or 148 and the shaft 109a. The slide member 5 has a slot 5b at its one side portion as depicted in the figures. The guide pin 114 on the auxiliary deck 110 is engaged with said slot 5b to cause the slide member 5 to slide in a desired direction. The slide member 5 further has a slanting edge 5c formed at its other side portion which is adapted to act on the roller 25 for forcing the head plate 15 in the above-mentioned forced position to cause the roller 25 to retreat from its position where it has been advanced far along the cammed portion 92 forcing the head plate 15 into the cassette loading space 80. Then, a head 180 is released from a tape, which establishes the fast forward/rewind mode in connection with the head. Even when the ejecting lever 2 is locked in the tilted position the shaft rod 140 as mentioned above is pressed back upon depression of the ejecting lever 2, in a direction towards the center line of the slot 201 from the enlarged portion 208 along the slanting edges 202. Accordingly, even if the ejecting lever 2 is depressed in the fast forward/rewind mode, the ejecting operation is carried out without any trouble. In addition, a slanting edge 5e is assures elimination of a trouble possibly caused in such depression of the ejecting lever. The ejecting operation is carried out not only by such a manual operation of the ejecting lever 2 but also by an automatic operation by the plunger 271 actuatable by a tape end detection signal. In case the ejecting operation is performed automatically, the pin 109a of the operating member 109 is depressed downwardly as viewed in FIG. 9(A) so that an automatic ejecting operation is effected from the fast forward/rewind mode.

As mentioned above, in accordance with the present invention, it will be apparent that not only the ejecting operation but also the fast forward/rewind operation can be carried out by a single operation member comprised of the ejecting lever 2 and the pushbutton knob 20. Thus, it will be appreciated that when the entire structure of the present invention is utilized in a unit to be mounted on a dashboard of a car, especially in a mobile stereo, it can provide an advantageous mechanism with minimized number of operation members. In addition, the structure of the present invention has a specific advantage that ejecting operation in a state where the mechanism is loacked in the fast forward-/rewind mode will cause no trouble, preventing damage of the mechanism etc. Thus, misoperation or inadvertent operation possibly caused by common use of the operation member, may be allowed without causing any damage in the structure. In addition, since the ejecting lever 2 and the main ejecting plate 9 is formed in separate members to be slidably coupled through engaging means and the spring 23 is provided between the rest 22 of the ejecting lever 2 and the shaft 140 fixed to the auxiliary deck 110, the ejecting lever 2 and the knob 20 is always kept in its original position where it slightly projects from the front of the player. This provides pleasant feeling to the operator as compared with conventional player where a pushbutton, when operated for ejection, is kept depressed and not reset to its projected position until it is manually reset. This structure of the conventional player has another disadvantage that when a cassette is loaded in such an ejection lever operated state, the lever projects abruptly in a direction opposite to the cassette loading direction, possibly striking fingers holding the cassette.

In the automatic ejecting operation as referred to above, the plunger 271 has connecting rod 272 pivotally connected thereto. A pin 277 provided on the rod 272 is adapted to abut against an M-shaped cammed groove formed on a cam plate 273 which is mounted on the main chassis 100 by a pivot 275. The pin 277 is adapted to alternatingly act on oppositely formed slanting faces 274, 274 to rock the cammed plate 273 around 275 upon every energization of the plunger 271. A pin 276 provided at a tip end portion of the cammed plate 273 is engaged with an elongated slot 267 provided at an end portion of a feeding direction selector 26. When the feeding direction selector 26 is operated to left or to right as viewed in FIG. 6(A) to actuate a roller 192a engaged with a cam slot 269 of the selector 26, the direction of a pinch roller holder 19 is operated, to wit, the pinch roller holder 19 is alternatingly advanced or retired. The relation between a pinch roller 190 and a capstan 107 in the pinch roller housing 19 is changed to switch the feeding direction of the tape. The selector 26 has at its other end portion an angular cammed portion 268 as depicted in FIG. 10(C). A pin 292a of an interlocking member 292 is adapted to abut against said cammed portion 268. The interlocking member 292 has at its one end portion a slot 292b with which a lower end of the shaft 109a is engaged, and at its intermediate portion an elongated slot 292c with which a lower end of the shaft rod 140 is engaged to regulate the sliding direction of the interlocking member 292. On the other hand, a spring 109b is provided between the shaft rod 140 and the lower end of the shaft 109a. During the sliding of the selector 26, the cammed portion 268 acts on the pin 292a to displace the interlocking plate 292 in the direction of the elongated slot 292c and the shaft 109a is pushed to the circumferential direction of the disc 14 against the action of the spring 109b to release the engagement of the shaft 109a with the stepped portion 147 or 148, cancelling the fast forward/rewind mode.

In accordance with the present invention the fast forward/rewind operation as well as the ejecting operation is carried out by a single member, namely, ejecting lever 2, and the fast forward/rewind mode can be locked through the engagement of the shaft 109a with the stepped portion 147 or 148 of the rotary disc 14. Thus, it will be appreciated that the apparatus of the present invention is advantageous in practical use because more than one operations can be achieved by a single operation member and suitable especially for application as a mobile unit. The apparatus is further advantageous in that the lock of the fast forward-/rewind mode is easily releasable by a relatively small force both by a manual operation with the ejecting lever 2 and by an automatic operation with the electromagnetic plunger 271. Furthermore, not only smooth cancel of the fast forward/rewind mode but also change-over of the tape feed direction and the take-up reel drive direction can be performed by a single plunger.

A preferred form of the magnetic record/playback apparatus in accordance with the present invention has an improved mechanism which assures a tape start in a predetermined direction when a tape cassette is loaded.

Figure 7B:
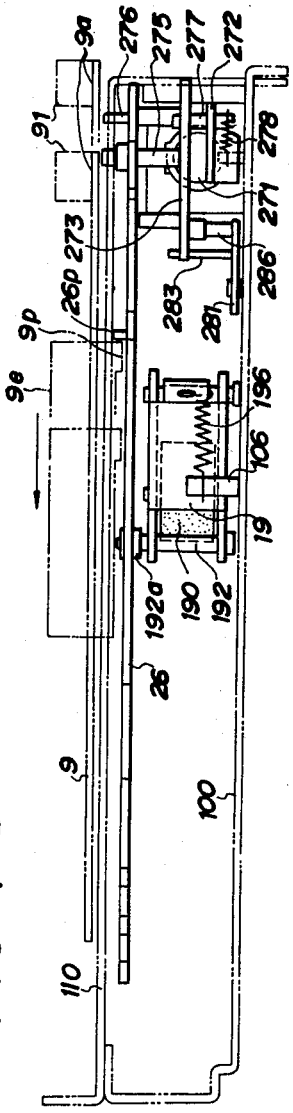

As shown in FIG. 6(B), the main ejecting plate 9 has an operating projection 9p formed so as to project downwardly from the plate 9. The operating projection 9p is provided in relation with a receiving portion 26p formed by erecting an inner portion of the feed direction selector 26 disposed along the lower face of the auxiliary deck 110 as depicted in FIGS. 6(B) and 7(B). A cammed portion 269 formed on the feed direction selector 26 is engaged with the roller 192a provided on the pinch roller holder 19 for the pinch roller 190 adapted to be abut against the capstan 170 of a flywheel 107w around which a first drive belt 303 from a motor 200 is wound. Upon the change-over operation of the selector 26, either one of the pinch rollers 190 is pressed against the corresponding capstan 170 through the tape to feed the same at a normal speed. On the other hand, since the capstans are adapted to be rotated in opposite directions each other, the tape feed direction is switched by changing over the contacting relation between the capstans 107, 107 and the pinch rollers 190, 190. Such a switching of the contacting relation is carried out by the plunger 271 of the electromagnetic solenoid 270. Stated illustratively, the plunger 271 is connected through the pin 277 of the connecting rod 272 to the cam plate 273 which is rotatable around 275. Upon alternate actuation of the pin 277 into the opposite recesses of the M-shaped cam slot 274 of the cam plate 273, the cam plate 273 is rotated in opposite directions alternatingly. On the other hand, the action of the pin 276 provided on the cam plate 273 and engaged with the slot 267 of the selector plate 26 displaces the plate 26 to left or to right as viewed in FIG. 6(B) for switching operation. Another pin 286 on the cam plate 273 is engaged with a slot 285 formed at the base end portion of the interlocking gear switcher 28 which is provided so as to extend in a direction vertical (up and down) as viewed in FIG. 6(B), to wit, in a direction perpendicular to that of the selector 26. The interlocking gear switcher 28 is further engaged with a pin 282b through an elongated slot 282. Thus, it will be seen that upon the rotation in alternating direction of the cam plate 273, the switcher 28 is slided up and down as viewed in FIG. 6(B). The operating plate 28 has at its forward end portion the groove 284 having a slanting portion intermediate thereof as mentioned above. With the groove 284 is engaged the pin 27b of the actuator 27 rotatably provided by a pivot 27c. A resilient member 27a provided on the actuator 27 is connected to the interlocking gear support 260 at its one end portion 261. Thus, it will be seen that the actuation of the interlocking gear switcher 28 will switch the interlocking gear support 260 through the actuator 27.

Figure 8B:
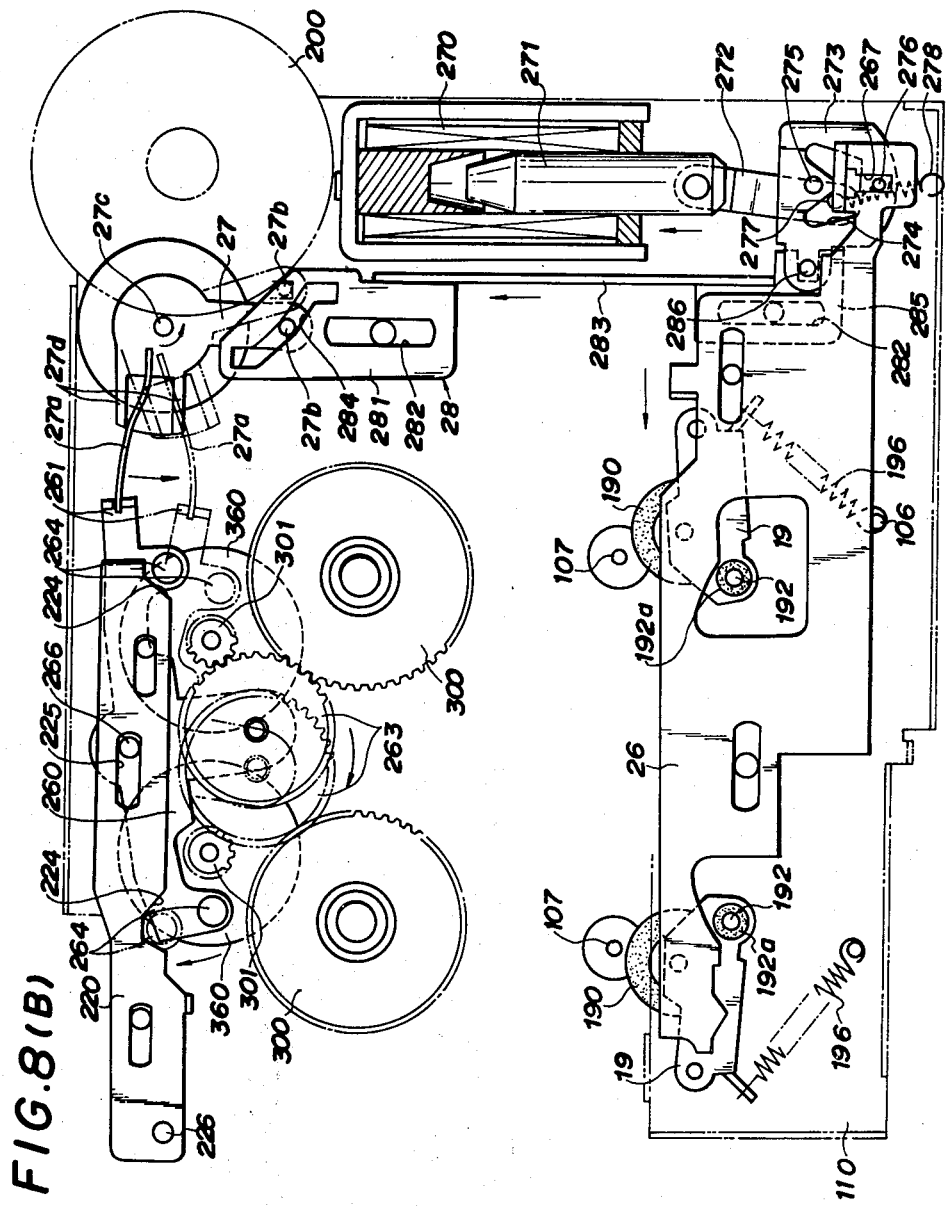

The details of the actuator 27 and the interlocking gear support 260 are shown also in FIG. 8(B). The base end of the resilient member 27a is mounted on the actuator 27 at a position near its pivotal shaft 27c and the tip end thereof is engaged with the support 260 at its forward end. On the opposite sides of the resilient member 27a are provided sidewalls 27d, 27d which extends from the actuator 27 to a position intermediate the resilient member 27a and assures the switching operation by the resilient member 27a for the operation of the actuator 27. More particularly, the interlocking gear support 260 is pivotably or rockably supported by the shaft 266 at its intermediate portion and is formed with the support portion 253 extending intermediate the support 260 and supporting the intermediate gear 268 thereon. By the switching operation of the actuator 27, a second drive system independent of the system formed by the motor 200, a belt 304 and the flywheels 107w, 107w is established. Then, the intermediate gear (interlocking gear) 268 is interposed between either one of gears 301, 301 of the pulleys 360, 360 around which the belt 304 is wound and corresponding one of the reel base gears 300, 300 to be meshed with them. In a state where the gear 301, intermediate gear 268 and reel base gear 300 are meshed each other and rotated, it will be seen from the mode as shown in the figures and observed when the switching operation is manually carried out that there is exerted due to moment of inertia a component of drawing force between the gear 301 and the reel base gear 300 with which the intermediate gear 268 is engaged. The higher the rotation speed is, the larger the force component is. Accordingly, it is difficult to smoothly release the intermediate gear 268 under such an interlocked condition by the operation force through the resilient member 27a alone, and it is difficult to attain the switching operation unless the rotation speed is somewhat lowered. However, the construction of the present embodiment which employs the sidewalls 27d, 27d can smoothly and surely attain the switching operation even under such conditions. Stated illustratively, the sidewalls 27d, 27d are adapted to contact the resilient member 27a intermediate thereof to impart rigidity to the resilient member 27a at its portion interior of the contact portion. In general, the operation force through the thus held resilient member 27a imparts to the operating end a force inversely proportional to a third power of the length of the resilient member 27a. In the switching operation of the actuator 27, if the switching cannot be effected due to resistance caused by such drawing force on the intermediate gear 268, either one of the sidewalls 27d, 27d is brought into contact with the resilient member 27a to support it. Accordingly, the length of the resiliently acting portion of the resilient member 27a is reduced to about half of the length of the resilient member 27a and therefore the operating force acting on the end portion 261 of the interlocking gear support 260 is drastically increased to surely and positively achieve the release of the intermediate gear 268.

In the embodiment as shown in the figures, the interlocking gear support 260 is thrown into a neutral position (a position where either of the gears 301, 301 and either of the reel base gears 300, 300 are not engaged with the intermediate gear 268) by the fast forward/rewind change-over plate 210 provided along the front of the main chassis 100. Stated illustratively, the fast forward/rewind change-over plate 210 is adapted to engage or disengage the intermediate gear 252 with the flywheel gear 107a and the reel base gear 300 through the selector member 240. Separately thereof, the interlocking plate 220 is also caused to slide so that either one of the cammed portions 224, 224 of the interlocking plate 220 acts on the corresponding one of the rollers 264, 264 of the interlocking gear support 260 to attain the switching operation, namely to throw the intermediate gear 268 into the neutral position, disengaging the gears. More particularly, while a normal tape feed for recording or reproducing is carried out by the drive system through the belt 304, tape feed at a high speed is effected readily for fast forward/rewind operation by releasing the interlocking system through the intermediate gear 268 and actuating the drive system through the flywheel 107w. In this connection, it is to be noted that the intermediate gear 268, the gear 301 and the reel base gear 300 may be employed simply as a pulley or a roller. In this case, such a moment of inertia due to the rotation force as mentioned above would also be observed.

The operation of this embodiment will now be explained. FIG. 6(B) shows a forward tape feed mode wherein the right pinch roller 190 is pressed against the capstan 107 to feed the tape of the cassette nipping it therebetween. When the tape feed direction selector 26 is caused to slide laterally, the pressing relation is switched to a condition where the tape is interposed and held between the left capstan and the left pinch roller. It is well known that this establishes a reverse feeding of the tape. When the cassette is removed from the apparatus after completion of reproduction, the mechanisms of the apparatus is either in a forward feed mode or in a reverse feed mode. In case the cassette is removed in the forward feed position as shown, the cassette is removed from the playback position and the selector 26 assumes its position as shown in FIG. 6(B). Then, if the main ejecting plate 9 is pressed forwardly, the operating projection 9p of the main ejecting plate 9 is advanced to not farther than a position shown by a phantom line in FIG. 6(B) and the selector 26 is not actuated, thus keeping the forward feed mode. In contrast, if the cassette is removed in a reverse feed mode where the selector 26 is displaced leftwardly from the position of FIG. 6(B), the receiving portion 26p of the selector 26 is pushed by the operating projection 9p upon the forward depression of the main ejecting plate 9 so that the leftwardly displace selector member 26 is returned to the position shown in FIG. 6(B) for establishing a forward feed mode. The displacement of the selector 26 rotates the cam plate 273 and accordingly reverses the interlocking gear switcher 28 and the actuator 27. The interlocking gear support 260 is then actuated through the resilient member 27a to switch the mesh relation of the intermediate or interlocking gear 268 from the engagement with the left gear 301 and reel base 300 to the engagement with the right gear 301 and reel base 300. Thus, it will be appreciated that the ejecting operation for removing the cassette 10 can attain formation of the forward feed mode and assure tape start in a predetermined direction without failure.

In accordance with this preferred embodiment of the present invention, the unidirectional start is achieved by the ejecting operation. More particularly, this preferred form of the magnetic record/playback apparatus can enjoy the unidirectional starting with advantage for cassette loading or unloading while enjoying advantages that wow and flutter etc. are effectively eliminated by independently providing the drive system for the flywheels of the drive system for the reel bases. Further due to separate provision of the drive systems, some of driving mechanism components otherwise should be employed and superposed at the flywheels can be omitted and the entire thickness of the apparatus can be reduced.

In another preferred form of the magnetic record/playback apparatus, improvement is made in operating mechanism of the head plate, assuring smooth advance and retire of the head plate and proper tape feed and record/playback mode.

In a magnetic record/playback apparatus, it is necessary to advance a head assembly with respect to a tape pack such as a tape cassette loaded in a record/playback position for achieving a desired record/playback mode and to retire the head assembly for cassette ejecting operation. To this end, it is general to mount the head assembly on a head plate and advance and retire the head plate with respect to the tape pack. In accordance with conventional operating mechanism of the head plate, however, a pin is provided on the head plate and an operating force is applied to a tip end portion of the pin so that the head plate is liable to subject to torsion or flapping, disadvantageously causing troubles in azimuth etc. with respect to the head assembly on the plate. The conventional mechanism further has another disadvantage that the operation is not always carried out smoothly. Especially in a type where a resetting spring is provided to the head plate to urge the plate for resetting and the head plate is adapted to be advanced against the action of the spring, the pressing force of the head assembly is liable to be reduced as the head assembly advances to the tape, resulting in insufficient contact with the tape. Furthermore, the tape feed is not satisfactory, either.

In the present embodiment, to solve the problems of the conventional method, the operation of the head plate is carried out horizontally, desirably pressure contact of the head is attained by combined forces, and stable head operation is made to attain stable tape feed or record/playback operation.

The mechanism for setting the cassette 150 drawn in the innermost position of the cassette loading space into the record/playback position is mentioned above referring to FIGS. 11 and 12.

In ejecting operation, upon advance of the main ejecting plate 9, the roller 97 advances (moves from a position shown by a solid line in FIG. 11 to a position shown by a phantom line in the figure) on the guide portion 170. Then, the pressure of the roller 97 through the guide portion 170 onto the cassette holder 55 to force the same against the main chassis 100 is released. Subsequently, the roller 97 enters under the inclined face 50b and further advances to raise the swingable frame 50 against the action of the spring 53. The roller 97 further advances under the lower face 50a of the base portion 50a parallel to the upper face thereof to raise the swingable frame 50, also pulling up and holding the cassette holder 55 and the cassette 150 to a predetermined position as shown by the phantom line of FIG. 11.

Figure 13:
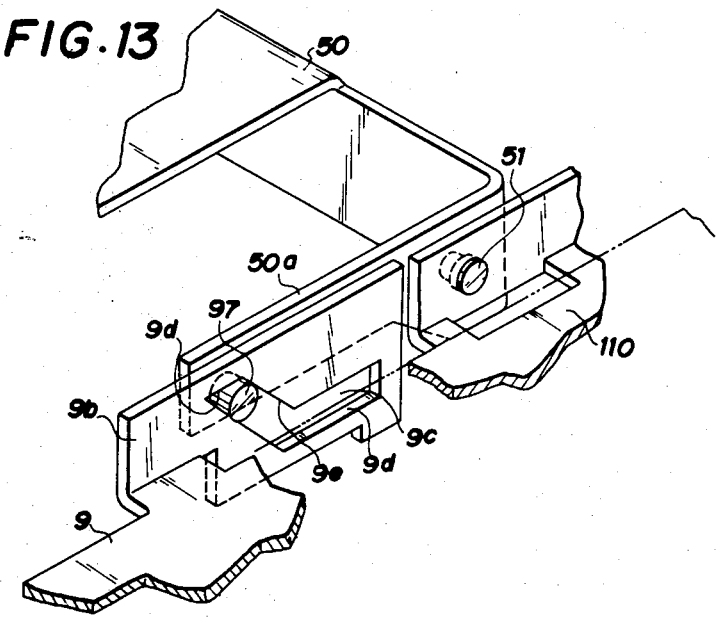
FIG. 13 is a similar view showing a modification of the structure shown in FIGS. 11 and 12.

The structure shown in FIGS. 11 and 12 may be modified in such a manner as shown in FIG. 13. In the modified arrangement, the roller 97 is provided to the base portion 50a of the swingable frame 50. The ejecting plate 9 has a bent portion 9b provided at its side end portion and formed with a guide slot 9c having horizontal portions 9d, 9d at different heights and a declining portion 9e communicating with said horizontal portions 9d, 9d. The roller 97 is received in the guide slot 9c. The so formed mechanism can perform substantially the same function as of the mechanism shown in FIGS. 11 and 12 without providing the guide member 17, to wit, putting the cassette holder 55 and the cassette 150 to the record/playback position and pulling up them to their standby positions.

Figure 17:
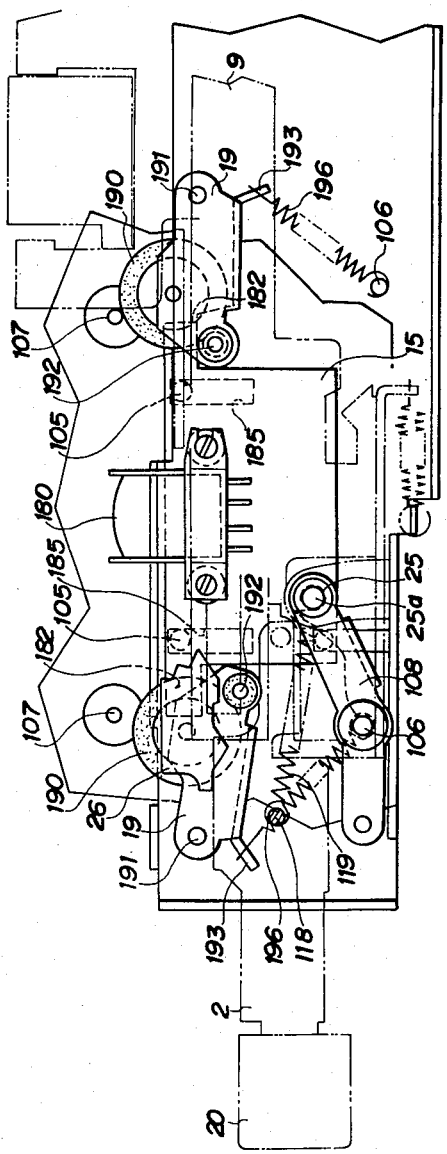
FIG. 17 is a plan view similar to FIG. 14 but showing the head plate in its advanced position.

The details of the mechaism for operating the head plate in accordance with this embodiment are shown in FIGS. 14 and 17. The head plate 15 is adapted to slide with guide pins 105, 105 engaged with the respective guide slots 185, 185 formed on the main chassis 100. On the head plate 15 is mounted a head assembly 180. The pinch roller holder 19, 19 are disposed on the opposite sides of the head assembly 180 and secured directly to the main chassis 100 by shafts 191. A pin 192 provided on each pinch roller holder 19 at its free end is adapted to abut against corresponding projection formed at the ends of the head plate 15. Tension springs 196 are provided between spring rests 193 projected from the respective shafts 191 and the shafts 106 on the main chassis, respectively, to urge the pinch roller to contact the capstan 107.

Figure 16:
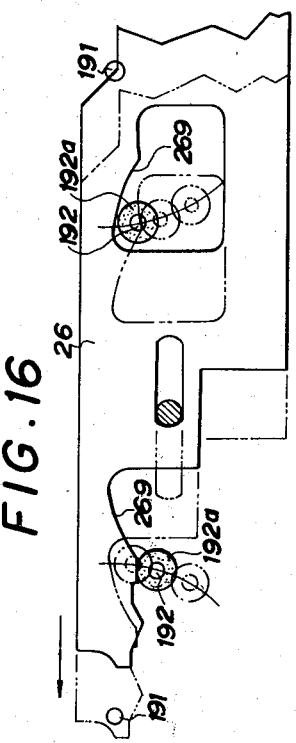
FIG. 16 is a fragmentary plan view of a selector plate showing its operation.

One of the shafts 106 also acts as a pivot for the link member 108 with a shaft 25a provided thereon. The shaft 25a is provided with the roller 25. The link member 108 has parallel portions 108a, 108a as shown in FIG. 15 through which the shaft 25a of the roller 25 is passed. The lower end of the shaft 25a is engaged with an elongated slot 15h. Between the shaft 25a and a resting pin 118 is provided a spring 119 for urging the link member 108 to rotate inwardly around the shaft 106. The selector 26 is provided under the auxiliary deck 110 and formed with cammed portions 26a, 26a which are each adapted to abut against respective rollers 192a of rods 192 as shown in FIG. 16. When the selector 26 is displaced laterally in a direction shown by an arrow of FIG. 16 for switching operation, either one of the pinch rollers 190, 190 is pressed against the capstan 107 for feeding the tape as can be seen from FIG. 17.

In accordance with this embodiment, upon operation of the main ejecting plate 9, the roller 25 is caused to advance or retire by the cammed portion 92 as mentioned above. When the shaft 25a of the roller 25 is moved, the head plate 15 provided on the main chassis 100 is caused to advance or retire within the limit of the slot 185. More particularly, the head plate 15 is slided along the main chassis 100 and operated by the shaft 25a which is firmly and fixedly held by the link member 100 having the parallel support portions as shown in FIG. 15. Thus, stable slide operation obtained without subjecting to torsion or flapping. The advance of the head plate 15 is attained by the spring 119 which is apparently compressed from its position of FIG. 14 as seen by comparison between FIGS. 14 and 17. The action of the spring 196 for the pinch roller holder 19 which in turn acts on the projected portion 182 is cancelled because the roller 192a assumes its position as shown in the left side of FIG. 17 where the roller 192a is engaged with convexed portion of the cammed portion 26a. As to the action of the other spring 196, since the forcing force is applied only to the head 180 after the pinch roller 190 has been engaged with the capstan 107 and since the operating force component due to the rotation of the link member 108 is larger in the position of FIG. 17 than in the position of FIG. 14, the head assembly 180 is positively and surely pressed to advance. In this connection it is to be noted that negative force component acting against the pressing is cancelled and positive rotational force is utilized. Thus, the force operating the head assembly to advance the same is selected to be of a given value. Further, since the pinch roller is mounted on the main chassis, the tape contact with the pinch roller is held stably and the tape heed is also performed stably.

A still preferred form of the magnetic record/playback apparatus in accordance with the present invention has an improved mechanism which is capable of smoothly and positively transmitting a rotational force and smoothly and readily carrying out change-over between gears, and capable of precisely carrying out formation of a normal tape feed mode and a fast forward/rewind mode using the gears and switching of the modes.

It has been well known to employ involute gears having opposite involute curved surfaces on each tooth for achieving smooth transmission of rotation force through engagement between gears. The transmission of the rotation force between the gears in mesh with each other, which is carried out between the involute curved surfaces, is very smooth and does not produce squeak. Thus such involute gears are widely employed especially for transmission system of various mechanism which requires smooth drive and prevention of squeak. In the interlocking system thus formed using involute gears, the interlocking relation is required to be switched according to necessity. However, conventional involute gears have a disadvantage that the meshing between the gears cannot be smoothly attained in such a switching operation. Stated illustratively, such an involute gear has curved surfaces formed up to the tip end of each tooth and flattened face at the tip end. It is likely for the flattened face to meet another flattened face, which prevents smooth meshing between the gears upon switching. Thus, the involute gears are avoided for gear systems in which smooth switching operation is desired. Therefore, it is general to employ frictional transmission wheels instead of the involute gears for example in case, the rotation transmission system is switched to a fast forward/rewind mode in rotation transmission system from a motor for tape feed in a tape recorder/player to attain smooth rotation force transmission and sure switching between rotation systems. However, where the frictional transmission wheels are employed, it is always required to apply appropriate pressure thereto. If the pressure is insufficient or varied, there will be caused troubles such as slip etc.

Figure 18:
FIG. 18 is a fragmentary view of involute gears employable for switching operation in the magnetic tape-record/playback apparatus of the present invention.

To solve these problems, in the preferred embodiment of the present invention, there is proposed switching operation gear having teeth as depicted in FIG. 18. More particularly, gears a, a adapted to mesh with each other have teeth b . . . b. Each of the teeth b has opposite involute curved surfaces c, c having a uniform curvature as in known manner. However, the involute gear in accordance with this embodiment provides teeth each having a pointed tip end e and inclined face f at a position outer than an intermeshing pitch circle d . . . d.

The embodiment also proposes to employ such improved involute gears in an interlocking system for switching between normal feed and fast forward/rewind in the magnetic record/playback apparatus.

As mentioned above, the pin 143 engaged with the slot 201 of the ejecting lever 2 is projected downwardly through an opening 116 formed on the auxiliary deck 110 at its base end portion. The pin 143 is engaged with a fork portion 216 formed at the base portion of a fast forward/rewind actuator lever 210. The actuator lever 210 has an elongated slot 211 engaged with a pin 109' provided at a lower portion of the upright portion 101 of the main chassis 100. The lever assembly thus mounted along the bottom of the main chassis is further adapted to slide laterally with a slot 212 engaged with a pin 108a provided at a side portion of a front edge 100e of the main chassis 100. The actuator lever 210 has a recessed cammed portion 213 at its one side portion as shown in FIGS. 1 and 6(A) and has another slot 215 extending intermediate thereof in its width direction. With the cammed portion 213 is engaged a pin 226 provided on an interlocking member 220 at its forward end which is disposed on the main chassis 100 extending in the longitudinal direction. The slot 215 is engaged with the pin 236 provided at one end portion of the L-shaped interlocking member 230 which is pivotably supported intermediate thereof on the main chassis 100. As shown by arrows in FIG. 6(A) and mentioned above, when the ejecting lever 2 is rotated to the left or right, the actuator lever 210 is caused to slide to the left or to the right. This in turn will displace the interlocking member 220 by the cammed portion 213 inwardly as shown in FIG. 8(A), namely in a direction shown by an arrow in FIG. 6. The L-shaped interlocking member 230 is rotated around 231 and the selector plate 240 pivotably connected to the L-shaped interlocking member 230 at 232 is also displaced inwardly as shown by an arrow of FIG. 6(A). The tip end of the selector plate 240 is connected at 241 to a tip end of the gear plate 250 pivotably supported at its base end by the pin 251 on the main chassis 100. An intermediate gear 252 rotatably provided intermediate the gear plate 250 is brought into mesh with either one of flywheels 107a, 107a coaxial with capstans 107, 107 and either one of reel base gears 300, 300 upon sliding of the elector plate 240. Thus, the rotation of the flywheel gear 107a which is much larger in diameter than the capstan 107 is directly conveyed to the reel base gear 300 through the intermediate gear 252.

Figure 6C:
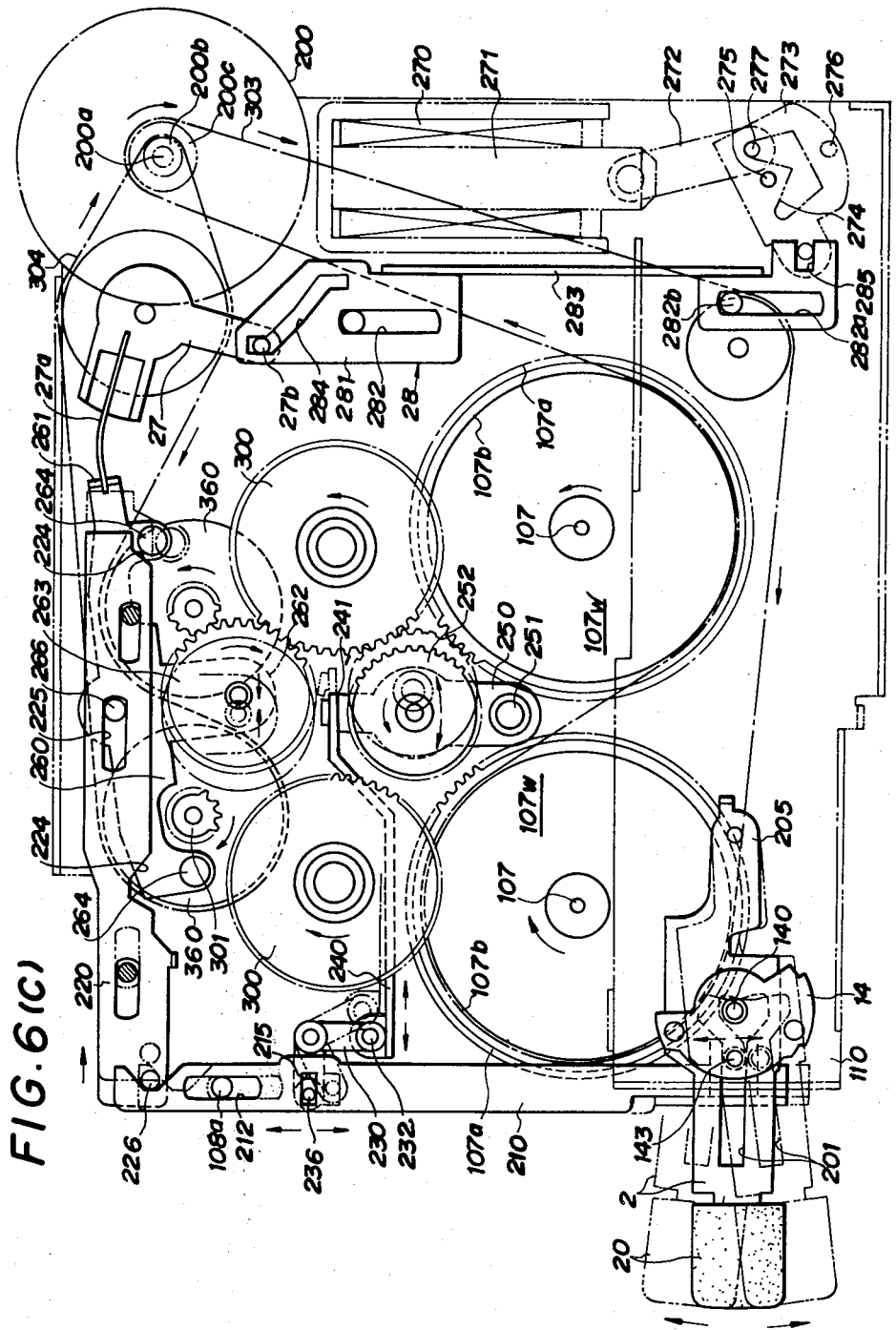

Stated illustratively, each of the flywheels 107w, 107w coaxial with the respective capstans 107 has a gear 107a and a pulley 107b. The belt 303 is wound across said pulley 107b and a pulley 200c provided on a motor shaft 200a as shown in FIG. 6(C) to rotate said flywheel 107w at a normal speed. In this embodiment, another belt 304 is provided between the motor shaft 200a and a pulley 360 for establishing the second drive system independent of the first drive system as mentioned above.

The interlocking member 220 assumes a position as shown by a solid line in FIG. 6(A) in a normal condition where the pin 226 is engaged with the recess of the cammed portion 213. An interlocking gear support 260 rockable around the shaft 266 provided on the main chassis 100 and received in the elongated slot 225 formed intermediate the interlocking member 220. The support 260 has a receiving portion 261 to which a resilient member 27a provided at a tip end of the actuator 27 is connected. The actuator 27 is responsive to a change-over operation by a plunger 271 operated by a tape end detection signal through the interlocking gear switcher 28, to rock the support 260 to right or left. The interlocking gear 263 at the support portion 262 projectingly formed intermediate the support 260 is then meshed with or disengaged from either one of the reel base gear 300, 300 and either one of the small gear 301, 301 driven by a motor to determine a rotation mode of the reel base gear for feeding the cassette tape forwardly or reversely. The interlocking member 220 is pushed inwardly in a direction of the arrow shown in FIG. 6 when the pin 226 is depressed by either one of the slanting edges of the cammed portion 213 upon the actuation of the selector lever 210. When either one of slanting cammed portions 224, 224 formed on the interlocking member 200 forces a corresponding one of rollers 264, 264 the support portion 262 in an inclined position as shown in FIG. 6(A) is brought into a right position as shown in FIG. 8(A). By bringing the support portion 262 into a position right with the length of the interlocking member 220, the interlocking gear 263 is disengaged from either of the reel base gears 300, 300 and the small gears 301, 301. The driving relation between either of the small gears 301, 301 and the reel base gears 300, 300 is cancelled. It will be then appreciated that by driving the reel base gear 300 released from the normal driving relation through the flywheel gear 107a, the desired fast forward/rewind mode can be smoothly attained.

Even when the ejecting lever 2 is locked in the tilted position the shaft rod 140 as mentioned above is pressed back, upon depression of the ejecting lever 2, in a direction towards the center line of the slot 201 from the enlarged portion 208 along the slanting edges 202. Accordingly, even if the ejecting lever 2 is depressed in the fast forward/rewind mode, the ejecting operation is carried out without any trouble. In addition, a slanting edge 5e assures elimination of a trouble possibly caused in such depression of the ejecting lever. The ejecting operation is carried out not only by such a manual operation of the ejecting lever 2 but also by an automatic operation by the plunger 271 actuatable by a tape end detection signal. In case the ejecting operation is performed automatically, the pin 109a of the operating member 109 is depressed downwardly as viewed in FIG. (A) so that an automatic ejecting operation is effected from the fast forward/rewind mode.

In this embodiment, there are provided two drive systems from the motor 200 and rotation force transmission can be obtained between the teeth b, b with involute curved surfaces c, c meshed with each other substantially in the same manner as the conventional involute gears. Since the involute curved surfaces c, c having an uniform curvature are formed deeper than the intermeshing pitch circle d—d, they impart no variation of the intermeshing pressure angle and accompanying efficiency decrease in rotation under meshed condition and assure positive and smooth rotation transmission. Further, in the switching operation, one of the teeth or both of them, when they are brought into contact with each other, are rotated to instantaneously attain proper intermeshing. Thus, the disadvantages involved in the conventional involute gear such that intermeshing is prevented when the confronting plane portions of the teeth are brought into contact with each other can be eliminated. Therefore, this novel involute gear can be employed without any trouble for various mechanisms which requires to perform smooth rotation transmission and switching operation.

If the so formed involute gears are applied to the fast forward/rewind switching mechanism in a magnetic record/playback apparatus, there can be constantly achieved proper rotation transmission without causing troubles such as performance degradation due to slip etc. and there can be attained smooth rotation even if the axes of the gears are slightly varied to assure smooth tape feed.

We claim:

1. A magnetic tape-record/playback apparatus having a mechanism for fast forward/rewind operation which comprises:

an ejecting lever for removing a magnetic tape;
an ejecting plate provided separately from said ejecting lever;
interlocking means for interlocking said ejecting lever and said ejecting plate allowing relative sliding movement therebetween;
a spring provided between said ejecting lever and a frame of said apparatus to urge said ejecting lever for resetting said lever to its original position;
a rotatable member actuatable to effect a switching operation in association with fast forward/rewind mode and having a pin and a stepped portion formed thereon;
an opening formed on said ejecting lever and having a slot portion engageable with said pin and a portion defined by convergent edges operative to reset said rotatable member to its position for tape ejecting operation; and
an engaging member provided in relation with said stepped portion of the rotatable member for keeping a head assembly of the apparatus in the fast forward/rewind mode.

2. A magnetic tape-record/playback apparatus as set forth in claim 1, which further comprises a tape feed direction selector plate having a cammed portion, and wherein said engaging stepped portion is formed on a periphery of said rotatable member and said engaging member is an engaging shaft adapted to be actuated by said cammed portion and adapted to be engaged with said stepped portion of the rotatable member to keep the fast forward/rewind mode.

3. A magnetic tape-record/playback apparatus as set forth in claim 1, which further comprises:

a tape feed direction selector plate to change over a pressing relation between pinch rollers and capstans for flywheels of said apparatus;
an interlocking gear selector member interlocked with said tape feed direction selector plate;
an actuator connected to said interlocking gear selector member;

an interlocking gear support rockably provided in relation with said actuator;

an interlocking gear mounted on said interlocking gear support and interposed between a pair of reel bases and a pair of gears adapted to be driven by a drive system independent of said flywheels; and a reel base drive system adapted to be switched by the rocking operation of said interlocking gear support.

4. A magnetic tape-record/playback apparatus as set forth in claim 1 including a head plate actuating mechanism which comprises:

a link member having upper and lower portions disposed in parallel with each other;

a roller adapted to abut against a cammed portion formed on the ejecting member and having a shaft provided at a free end portion of said link member;

a main chassis;

a head plate slidably provided on said main chassis;

an actuating portion of said shaft of the roller which extends downwardly from the lower face of the link member and is adapted to engage with said head plate;

pinch roller frames pivotably supported on said main chassis on the opposite sides of the head plate;

engaging projections provided at opposite end portions of the head plate and engageable with corresponding free ends of the pinch roller frames, respectively;

spring means provided between said pinch roller frames and the main chassis for urging pinch rollers supported by said pinch roller frames towards corresponding capstans of the apparatus, respectively; and spring means provided between said free ends of the link member and the frame of the apparatus for imparting rotating force to said link member.

5. A magnetic tape-record/playback apparatus as set forth in claim 1, which further comprises a plurality of gears employable for switching between normal tape feed and fast forward/rewind tape feed, said gears having teeth each formed of opposite involute curved surfaces having a uniform curvature and inclined surfaces at a portion outer than the intermeshing pitch circle of the teeth to provide a pointed tip end.

6. A magnetic tape-record/playback apparatus as set forth in claim 1, a main slide member and an auxiliary slide member slidably provided on a side of a magnetic tape loading space;

a friction member provided to said main slide member at a position confronting said magnetic tape loading space for holding a forward side end portion of a magnetic tape case;

spring means of a relatively weak biasing force which connects said main slide member and said auxiliary slide member;

another spring means of a relatively strong biasing force provided between the frame of the apparatus and said auxiliary slide member;

a guide slot formed on said main slide member in a direction perpendicular to the sliding direction of said main slide member;

a drawing interlocking member supported intermediate thereof by a shaft;

an engaging pin provided at one end portion of said drawing interlocking member and engageable with said guide slot;

an interlocking link having an end to which another end of said drawing interlocking member is pivotably connected; and an L-shaped slot formed on said auxiliary slide member and engageable with another end of said interlocking link.

* * * * *